United States Patent
Hiratsuka et al.

(10) Patent No.: US 8,994,905 B2
(45) Date of Patent: Mar. 31, 2015

(54) LIQUID CRYSTAL DISPLAY DEVICE

(71) Applicant: Japan Display Inc., Mobara-shi, Chiba (JP)

(72) Inventors: Takato Hiratsuka, Chiba (JP); Osamu Itou, Hitachi (JP)

(73) Assignee: Japan Display Inc., Tokyo (JP)

( * ) Notice: Subject to any disclaimer, the term of this patent is extended or adjusted under 35 U.S.C. 154(b) by 105 days.

(21) Appl. No.: 13/711,686

(22) Filed: Dec. 12, 2012

(65) Prior Publication Data

US 2013/0148048 A1    Jun. 13, 2013

(30) Foreign Application Priority Data

Dec. 13, 2011   (JP) .................................. 2011-272343

(51) Int. Cl.
  *G02F 1/1343*      (2006.01)
(52) U.S. Cl.
  CPC ........ *G02F 1/1343* (2013.01); *G02F 1/134363* (2013.01); *G02F 2201/123* (2013.01)
  USPC ............................................. 349/139; 349/38
(58) Field of Classification Search
  CPC .......................... G01F 1/1343; G01F 1/134363
  USPC .................................................... 349/139, 38
  See application file for complete search history.

(56) References Cited

U.S. PATENT DOCUMENTS

| | | | | |
|---|---|---|---|---|
| 7,688,410 | B2 * | 3/2010 | Kim et al. ...................... | 349/114 |
| 7,728,942 | B2 * | 6/2010 | Hirakata et al. .............. | 349/141 |
| 2004/0227891 | A1 | 11/2004 | Hirota | |
| 2006/0055861 | A1 | 3/2006 | Hirota | |
| 2006/0181665 | A1 | 8/2006 | Hirota | |
| 2006/0290869 | A1 * | 12/2006 | Suzuki ........................... | 349/143 |
| 2007/0194322 | A1 | 8/2007 | Sung et al. | |
| 2008/0239181 | A1 * | 10/2008 | Jin ................................... | 349/38 |
| 2008/0299690 | A1 | 12/2008 | Hirota | |
| 2010/0302492 | A1 * | 12/2010 | Kubota et al. ................. | 349/138 |
| 2011/0128491 | A1 * | 6/2011 | Kubota et al. ................. | 349/139 |
| 2012/0069283 | A1 * | 3/2012 | Kizu et al. .................... | 349/141 |

FOREIGN PATENT DOCUMENTS

| | | |
|---|---|---|
| JP | 6-214244 | 8/1994 |
| JP | 2010-224406 | 10/2010 |
| KR | 10-2004-0098545 | 11/2004 |
| KR | 10-2007-0083019 | 8/2007 |

OTHER PUBLICATIONS

Corresponding Office Action in EP Appln. No. EP12197020.6, dated Mar. 18, 2013.
Office Action in corresponding Korean Patent Application No. 10-2004-0098545, mailed Feb. 28, 2014, with English translation thereof.

* cited by examiner

*Primary Examiner* — Edward Glick
*Assistant Examiner* — Sang V Nguyen
(74) *Attorney, Agent, or Firm* — Lowe Hauptman & Ham, LLP

(57) ABSTRACT

The liquid crystal display device is provided with: a pair of first electrodes in wall form that at least partially overlap a pair of first structures; and a second electrode sandwiched between the pair of first electrodes, wherein the first electrodes are formed of: a wall electrode that is formed on a sidewall surface of the structure, protruding so as to be in a wall form in a direction of a normal to the first substrate and running in the longitudinal direction of the pixel; and a plane electrode that runs in a plane direction of the first substrate from a side of the wall electrode on the first substrate side in such a manner that an end portion thereof runs in proximity to the second electrode, and at least either the plane electrode or the second electrode covers the pixel display region.

4 Claims, 20 Drawing Sheets

LIQUID CRYSTAL DISPLAY DEVICE

CROSS-REFERENCE TO RELATED APPLICATION

The present application claims priority over Japanese Patent Application JP 2011-272343 filed on Dec. 13, 2011, the contents of which are hereby incorporated into this application by reference.

BACKGROUND OF THE INVENTION (1) Field of the Invention

The present invention relates to a liquid crystal display device, and in particular, to an IPS type liquid crystal display device where an electrical field is applied parallel to the surfaces of the substrates.

(2) Description of the Related Art

Liquid crystal display devices which are referred to as an IPS (in-plane switching) type are liquid crystal display devices where liquid crystal molecules are aligned horizontally to the surface of the panel and are rotated by 90 degrees within the horizontal surface when an electrical field (lateral electrical field) parallel to the panel surface is applied. In this IPS type liquid crystal display device, common electrodes are formed on the first substrate side where video signal lines (drain lines), scan signal lines (gate lines), thin film transistors and pixel electrodes are formed, and the liquid crystal layer is driven by the electrical field in a direction within the plane of the first substrate that is caused by the difference in the electrical voltages applied to the pixel electrodes and the common electrodes. In the IPS type liquid crystal display device having such a structure, pixel electrodes in linear form are arranged in a layer above the common electrodes in plane form that are formed of a transparent conductive film with an insulating film in between so as to overlap the common electrodes. This structure allows an electrical field to be created in the direction of the normal to the first substrate in a layer above the electrodes in linear form or in portions between adjacent electrodes in linear form, and therefore, liquid crystal molecules incline instead of being parallel to the panel surface, and thus, it is known that the display mode efficiency lowers.

In recent years, the performance of liquid crystal display devices has been increased, and such products that make a WVGA display of 800×480 pixels possible have been demanded as middle to small-sized liquid crystal display devices of three to four inches. In middle to small-sized liquid crystal display panels where a WVGA display is possible, however, it is necessary to form a number of display pixels (hereinafter referred to as pixels) within a limited display region, and therefore, the width of one pixel becomes approximately 30 μm. As a result, a further increase in the aperture ratio and in the display mode efficiency has been demanded.

An example of such a liquid crystal display device where the display mode efficiency has been increased is described in JP 6-214244A. In this liquid crystal display device in JP 6-214244A, a pair of electrodes are formed at the two ends of a pixel region, and a video signal is supplied to one electrode (pixel electrode, source electrode) and a common signal is supplied to the other electrode (common electrode) as a reference so that an electrical field that is parallel to the main surface of the liquid crystal display panel (a so-called lateral electrical field) is created to drive the liquid crystal molecules in the structure. In the liquid crystal display device in JP 6-214244A in particular, the pixel electrodes and the common electrodes are formed in a wall form so as to protrude from the main surface of the first substrate towards the second substrate, and at the same time, the direction in which they run is perpendicular to the main surface of the first substrate. As a result of this structure, the liquid crystal display device in JP 6-214244A makes the density of the lines of electric force uniform in regions close to and far away from the first substrate (in regions far away from and close to the second substrate), and thus, the structure allows the display mode efficiency to increase.

SUMMARY OF THE INVENTION

In the liquid crystal display device in JP 6-214244A, however, a region having no electrodes is provided between a wall electrode provided on a pixel border and a pair of common electrodes (hereinafter referred to as pseudo-wall electrodes) provided between wall electrodes. That is to say, the structure provides two parallel wall electrodes (for example, common electrodes) that correspond to adjacent pixels respectively in a portion of a pixel border, and therefore, no other electrodes can be formed between the two wall electrodes formed along this pixel border.

As a result, liquid crystal moves due to the effects of a potential around pixels, for example, a potential in a signal wire, such as a gate line or a drain line, and a potential in an adjacent pixel, and such a problem arises that the transmittance of black increases. In addition, in the case where an electrode that forms a capacitor (hereinafter referred to as capacitor electrode) is provided in a layer beneath a wall electrode, such a problem arises that the potential in the capacitor electrode, the potential in a signal wire and the potential around the pixel, that is the potential in an adjacent pixel, have such an effect that the transmittance of white lowers. Furthermore, in the case where a wall electrode is patterned through exposure to light using a mask when a lithographic technology is used for the formation of wall electrodes, a protruding insulator is formed as a base of a wall electrode, and after that, a conductive film is formed on the sides of the insulator. In this structure, there is a certain amount of shift between layers when the protruding insulator and the conductive films are formed, and therefore, it is necessary for the shift between layers to be smaller in order for the electrodes (wall electrodes) to be formed stably on the sides of the protruding insulator, and the solution for this has been desired.

The present invention is provided in view of these problems, and an object of the present invention is to provide a liquid crystal display device where the display mode efficiency can be increased by making the distribution of the electrical field uniform within pixels.

(1) In order to achieve the above-described object, the liquid crystal display device according to the present invention has a first substrate and a second substrate that are provided so as to face each other with a liquid crystal layer in between, wherein the above-described first substrate has video signal lines that run in a Y direction and are aligned in an X direction and scan signal lines that run in the X direction and are aligned in the Y direction so that pixels are formed in a matrix with each pixel in a region between a pair of video signal lines and a pair of scan signal lines, and the liquid crystal display device further has:

a pair of first electrodes in wall form that at least partially overlap a pair of first structures that are formed along either side in the longitudinal direction of a pixel so as to protrude from the above-described first substrate on the liquid crystal side towards the above-described liquid crystal layer side; and a second electrode formed in a pixel display region sandwiched between the above-described pair of first electrodes and formed in a direction in which the above-described first electrodes run, the above-described first electrodes are formed of:

a wall electrode that is formed on a sidewall surface of the above-described structure, protruding so as to be in a wall form in a direction of a normal to the above-described first substrate and running in the longitudinal direction of the pixel; and a plane electrode that runs in a plane direction of the first substrate from a side of the above-described wall electrode on the first substrate side in such a manner that an end portion thereof runs in proximity to the second electrode, and at least either the above-described plane electrode or the above-described second electrode covers the above-described pixel display region.

According to the present invention, the distribution of the electrical field can be made uniform within the pixels, and thus, the display mode efficiency can be increased.

The other effects of the present invention will be clarified from the description of the entirety of the specification.

DESCRIPTION OF THE EMBODIMENTS

In the following, the embodiments to which the present invention is applied are described in reference to the drawings. Here, in the following descriptions, the same symbols are attached to the same components, and thus, the same descriptions are not repeated. In addition, X, Y and Z indicate the X axis, the Y axis and the Z axis, respectively.

First Embodiment

Figure 1:
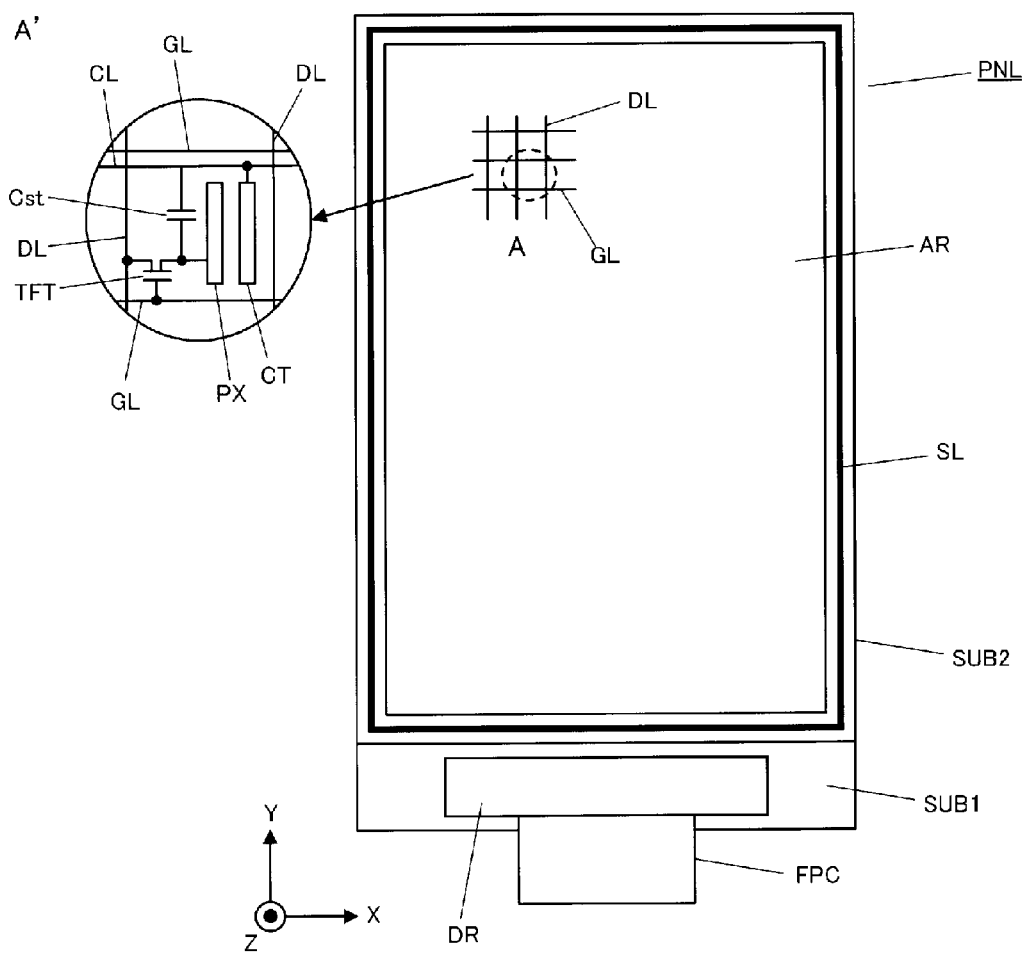
FIG. 1 is a plan diagram for illustrating the entire structure of a liquid crystal display device according to the first embodiment of the present invention.

FIG. 1 is a plan diagram for illustrating the entirety of the structure of a liquid crystal display device according to the first embodiment of the present invention. In the following, the entirety of the structure of the liquid crystal display device according to the first embodiment is described in reference to FIG. 1. Here, in the present specification, the transmittance gained by excluding the effects from the absorption by the color filters CF and the polarizing plates as well as the effects of the aperture ratio is referred to as display mode efficiency. Accordingly, the display mode efficiency is 100% when the linearly polarized light that has been emitted from the polarizing plate on the backlight unit side enters into the polarizing plate on the display surface side with the direction of vibration rotated by 90 degrees.

As shown in FIG. 1, the liquid crystal display device according to the first embodiment has a liquid crystal display panel PNL formed of a first substrate SUB1 on which pixel electrodes PX and thin film transistors TFT are formed, a second substrate SUB2 that is provided so as to face the first substrate SUB1 and on which color filters are formed, and a liquid crystal layer sandwiched between the first substrate SUB1 and the second substrate SUB2. In addition, the liquid crystal display device is formed through a combination of the liquid crystal display panel PNL and a backlight unit (backlight device) that becomes a light source and is not shown. The first substrate SUB1 and the second substrate SUB2 are fixed to each other with a sealing material SL applied to the periphery of the second substrate in an annular form, and the structure allows liquid crystal to be sealed therein. Here, in the liquid crystal display device according to the first embodiment, the region where display pixels (hereinafter abbreviated as pixels) are formed within the region where the liquid crystal is sealed becomes the display region AR. Accordingly, the region where no pixels are formed and which does not display anything does not become the display region AR even within the region where liquid crystal is sealed.

In addition, the second substrate SUB2 has a smaller area than the first substrate SUB1 so that the side portion of the first substrate SUB1 on the bottom side in the figure can be exposed. A drive circuit DR formed of a semiconductor chip is mounted on this side portion of the first substrate SUB1. This drive circuit DR drives the respective pixels arranged in the display region AR. Here, in the following descriptions, the liquid crystal display panel PNL may be referred to as liquid crystal display device. In addition, well-known glass substrates are generally used as bases of the first substrate SUB1 and the second substrate SUB2, but transparent insulating substrates made of a resin may also be used.

In the liquid crystal display device according to the first embodiment, scan signal lines (gate lines) GL that run in the X direction in FIG. 1 and are aligned in the Y direction and to which a scan signal is supplied from the drive circuit DR are formed within the display region AR on the first substrate SUB1 on the liquid crystal side. In addition, video signal lines (drain lines) DL that run in the Y direction in FIG. 1 and are aligned in the X direction and to which a video signal (gradation signal) is supplied from the drive circuit DR are formed. Regions between two adjacent drain lines DL and two adjacent gate lines GL form pixels, and a number of pixels are aligned along the drain lines DL and the gate lines GL so as to form a matrix within the display region AR.

As shown in the equivalent circuit diagram A' within the circle A in FIG. 1, each pixel is provided with a thin film transistor TFT that is driven and turned on/off by a scan signal from a gate line GL, a pixel electrode PX in wall form to which a video signal is supplied from a drain line DL through the thin film transistor TFT when this is turned on, and a common electrode CT in wall form to which a common signal having a potential that is a reference for the potential of the video signal is supplied through a common line CL. In the equivalent circuit diagram A' within the circle A in FIG. 1, the pixel electrode PX and the common electrode CT are schematically shown in linear form, but the structures of the wall pixel electrode PX and the wall common electrode CT in the first embodiment are described in detail below. Here, the thin film transistor TFT in the first embodiment is driven so that the drain electrode and the source electrode can be switched depending on the bias that is applied. In the present specification, however, the one connected to the drain line DL is referred to as drain electrode and the one connected to the wall pixel electrode PX is referred to as source electrode.

An electrical field having components that are parallel to the main surface of the first substrate SUB1 is generated between the wall pixel electrode PX and the wall common electrode CT, and this electrical field drives molecules of liquid crystal. Liquid crystal display devices having this structure are known for the ability of a so-called wide view angle display and are referred to as IPS type because of its particularity in the application of the electrical field to the liquid crystal. In addition, in the liquid crystal display device according to the first embodiment, the light transmittance is minimum (black display) in the case where no electrical field is applied to the liquid crystal, and thus, the display mode is normally black where the light transmittance increases when an electrical field is applied.

The respective drain lines DL and the respective gate lines GL run so as to transcend the sealing material SL at their ends and are connected to the drive circuit DR for generating a drive signal, such as a video signal or a scan signal, on the basis of the input signal inputted from the external system through the flexible printed circuit board FPC from an external system. Here, in the liquid crystal display device according to the first embodiment, the drive circuit DR is formed of a semiconductor chip and is mounted on the first substrate SUB1 in the structure, but either one or both of the video signal drive circuit for outputting a video signal and the scan signal drive circuit for outputting a scan signal is mounted on a flexible printed circuit board FPC in accordance with a tape carrier system or a COF (chip on film) system so as to be connected to the first substrate SUB1 in the structure.

<Detailed Structure of a Pixel>

Figure 2:
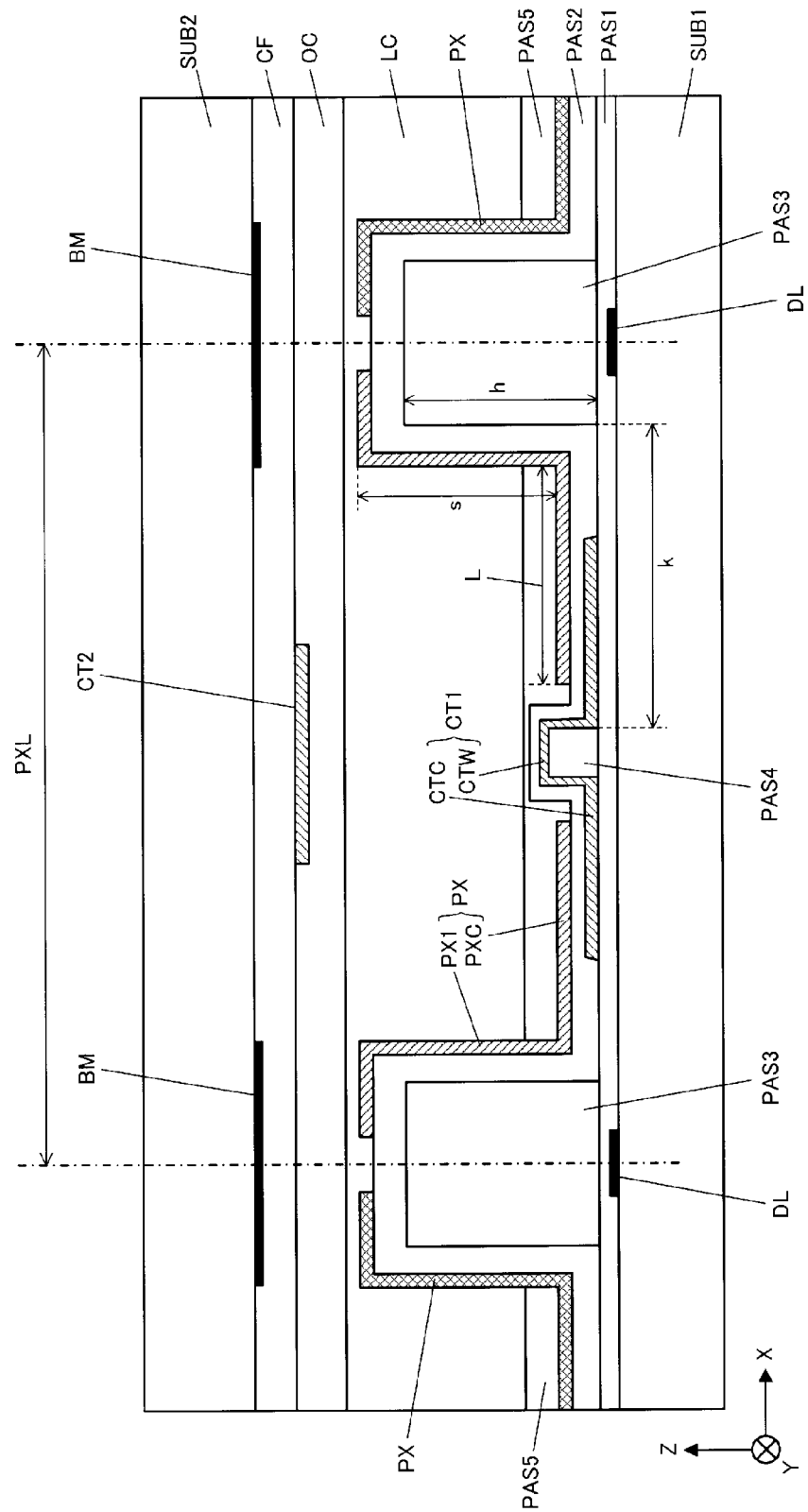
FIG. 2 is a cross-sectional diagram for illustrating the structure of a pixel in the liquid crystal display device according to the first embodiment of the present invention.
Figure 3:
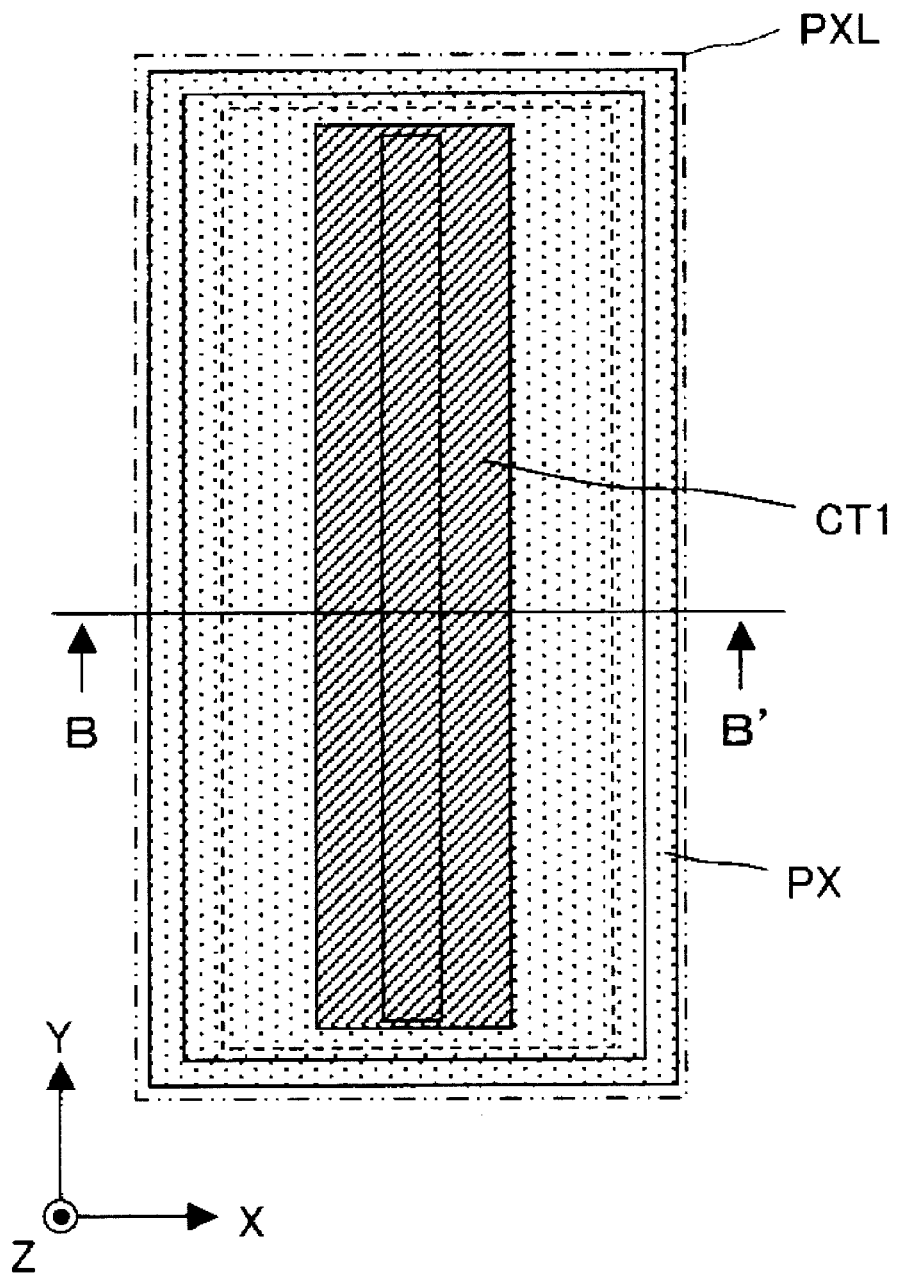
FIG. 3 is a plan diagram showing one pixel for illustrating the pixel structure in the liquid crystal display device according to the first embodiment of the present invention.

FIG. 2 is a cross-sectional diagram for illustrating the structure of a pixel in a liquid crystal display device according to the first embodiment of the present invention. FIG. 3 is a plan diagram showing one pixel for illustrating the pixel structure in the liquid crystal display device according to the first embodiment of the present invention. In particular, FIG. 2 is a cross-sectional diagram along line B-B' in FIG. 3.

Here, in the following description, well-known polarizing plates provided on the first substrate SUB1 and on the second substrate SUB2 on the side that faces the liquid crystal layer LC (on the display side and on the rear side of the liquid crystal display device) and well-known polarizing plates formed on the first substrate SUB1 and the second substrate SUB2 on the liquid crystal layer LC side are omitted. In addition, the polarizing plates may have such a structure as to be formed on the first substrate SUB1 and on the second substrate SUB2 on the liquid crystal layer LC side using a well-known technology.

As shown in FIG. 2, in the pixel structure according to the first embodiment, wall structures provided at the two ends of a pixel in the X direction, that is to say, insulating films in wall form that run in the Y direction (hereinafter referred to as wall electrode insulating films), have wall electrodes PX1 formed so as to cover the sides (sidewall surfaces) and plane electrodes PXC formed so as to extend in the direction in a plane from the side portions of the wall electrodes PX1 on the substrate side. A wall electrode PX1 and a plane electrode PXC are electrically connected to each other so that a wall pixel electrode (first electrode) PX is formed of the wall electrode PX1 and the plane electrode PXC. In addition, in the first embodiment, an insulating film PAS2 is provided between the plane electrodes PXC and the liquid crystal layer LC, wall pixel electrodes PX are provided along the pixel borders so that a pair of wall pixel electrodes PX form one pixel PXL. A pair of electrodes (common electrodes) CT1, CT2 are provided between a pair of wall pixel electrodes PX that form this pixel, and thus, a common electrode CT in pseudo-wall form (hereinafter referred to as pseudo-wall common electrode) is formed.

In the first embodiment, the wall pixel electrodes PX at the two ends of a pixel are source electrodes, and the pseudo-wall common electrode CT provided between them is a common electrode, but the wall pixel electrodes PX at the two ends of a pixel may be common electrodes and the pseudo-wall common electrode CT may be a source electrode.

In addition, in the pixel structure according to the first embodiment, a structure PAS4 in wall form that is lower than the wall electrode insulating film PAS3 (hereinafter referred to as pseudo-wall electrode insulating film) is formed between the wall electrodes insulating films (first structures) PAS3 along the borders of the pixels. The common electrode (second electrode) CT1, which is the pseudo-wall common electrode CT on the first substrate SUB1 side, is formed so as to cover the pseudo-wall electrode insulating film (second structure) PAS4, and a common electrode CT1 is formed in a direction in a plane on the surface of the pseudo-wall electrode insulating film PAS4 that makes contact with the substrate. A plane common electrode (second plane electrode) CTC that runs from the electrode (hereinafter referred to as wall common electrode) CTW that covers the pseudo-wall electrode insulating film PAS4 and the plane electrode PXC that forms the wall pixel electrode PX are provided within this common electrode CT1 with an interlayer insulating film PAS2 in between so that a capacitor Cst is formed. In addition, a black matrix BM that becomes a light blocking layer, color filters CF corresponding to R (red), G (green) and B (blue), a common electrode (third electrode) CT2, and an overcoat layer OC for covering the upper surface are formed on the second substrate SUB2 on the liquid crystal side where the second substrate SUB2 is provided so as to face the first substrate SUB1 with the liquid crystal layer LC in between.

At this time, as shown in FIG. 3 and as is clear from the positional relationship between the wall pixel electrode PX, which is a pixel electrode in wall form for one pixel, and the common electrode CT1 in wall form in the pixel structure according to the first embodiment, the pixels PXL in the liquid crystal display device according to the first embodiment are formed so as to have a pixel electrode PX in wall form (wall pixel electrode) formed along the periphery of a pixel PXL and a common electrode CT1 in wall form that is formed so as to be surrounded by the wall pixel electrode PX. In particular, in the pixel structure according to the first embodiment, the plane electrode PXC and the plane common electrode CTC are provided to face each other with an insulating film PAS2 in between in the region surrounded by the wall electrode insulating film PAS3 and the pseudo-wall electrode insulating film PAS4 so that a capacitor Cst for this pixel is formed in the structure.

As is clear from FIGS. 2 and 3, a conductive film (plane electrode PXC) that is formed of a conductive film for forming a wall pixel electrode PX in the first embodiment that runs in the direction towards the inside of the pixel PXL (in the direction of the common electrode CT1) and a conductive film (plane common electrode CTC) that is formed of a conductive film for forming the common electrode CT1 in wall form that runs in the direction of the short sides of the pixel (in the X direction in the figure, that is to say, in the direction of the pixel electrode PX) are provided so as to overlap each other with the insulating film PAS2 in between. In this structure, the plane electrode PXC and the plane common electrode CTC form a capacitor Cst for the pixel PXL. The insulating film PAS2 for forming this capacitor Cst can be formed of an insulating film material that is well-known for forming a capacitor, and the capacitor Cst can be formed of such an insulating film material for a capacitor so that the capacitance can be sufficient for maintaining the charge even in a small pixel electrode. Thus, in the pixel structure according to the first embodiment, the capacitor Cst is formed in the structure using a region through which backlight for the pixel PXL passes through. As a result, the area of the plane electrode PXC and the plane common electrode CTC for forming the capacitor Cst can be increased, and therefore, a large aperture ratio can be provided in comparison with the case where a capacitor Cst is formed in an end portion of a pixel PXL. Here, the insulating film material for forming the insulating film PAS2 is not limited to a material for forming a capacitor.

In addition, in the pixel PXL according to the first embodiment, the plane common electrode CTC is formed when the common electrode CT1 in wall form is formed, and at the same time, the plane electrode PXC is formed when the wall pixel electrode PX is formed in the structure. Furthermore, the insulating film PAS2, which is a thin film layer formed between the plane electrode PXC and the plane common electrode CTC, is an insulating film for electrically insulating the wall pixel electrode PX from the common electrode CT1, and therefore, the capacitor Cst can be formed in the pixel structure according to the first embodiment without specifically providing a process for forming the capacitor Cst.

In addition, in the pixel PXL according to the first embodiment, a wall electrode insulating film PAS3 is formed as a protruding wall structure as shown in FIG. 2 on the first substrate SUB1 on the liquid crystal layer LC side in such a manner as to cross the border portion with adjacent pixels shown as a two-dotted chain line in FIG. 3. Furthermore, a pseudo-wall electrode insulating film PAS4, which is a protruding wall structure of which the amount of protrusion towards the liquid crystal layer LC, that is to say, the height of the insulating film, is smaller than the wall electrode insulating film PAS3, is formed in the location that is a predetermined distance away from the insulating film PAS3 in the longitudinal direction of the wall pixel electrode PX. An electrode made of a conductive film material is formed on the surface on top of and on the sidewalls of this pseudo-wall electrode insulating film PAS4 so that a common signal is supplied and a common electrode CT1 is formed in the structure.

Here, in the pixel structure according to the first embodiment, the wall pixel electrode PX formed in the periphery portion of a pixel region and a common electrode CT1 that is formed in a region surrounded by the wall pixel electrode PX formed in the periphery portion, that is to say, in a region through which backlight passes, form a wall electrode. Accordingly, only the wall pixel electrode PX is formed in the periphery portion of the pixel along the short sides in the structure without the protruding wall electrode insulating film PAS3 being formed, for example, in order to prevent the liquid crystal LC sealed between the first substrate SUB1 and the second substrate SUB2 from being biased. Alternatively, the liquid crystal LC can be prevented from being biased even in the case of such a structure where part of the protruding wall electrode insulating film PAS3 formed along the short sides of the pixel do not protrude towards the liquid crystal layer LC, that is to say, the wall electrode insulating film PAS3 formed in the periphery portion in the direction of the short sides is smaller than the width of the pixel in the direction of the short sides of the pixel.

<Detailed Description of a Capacitor>

In the following, the structures of the wall pixel electrode PX, the common electrode CT1 and the capacitor Cst in the pixel structure according to the first embodiment are described in detail in reference to FIGS. 2 and 3.

As shown in FIG. 3, the wall electrode PX1 of the wall pixel electrode PX is formed along the border portions with the adjacent pixels shown by a two-dotted chain line, that is to say, the periphery portion of the pixel PXL, so as to surround the region of the pixel PXL. The common electrodes CT1 and CT2 are formed along the longitudinal directions (Y direction in the figure). In particular, in the liquid crystal display device according to the first embodiment, a protruding wall electrode insulating film PAS3 is formed along the border portions of the pixel shown by a two-dotted chain line, and this structure provides a step along the peripheral portion of the pixel PXL. The wall electrode PX1 is formed on the sidewall in the step, that is to say, on the sidewall of the wall electrode insulating film PAS3, and at the same time, the plane electrode PXC is formed along the main surface of the first substrate SUB1 so as to continue from the wall electrode PX1 in the structure so that the wall electrode PX1 and the plane electrode PXC form the wall pixel electrode PX. This structure provides a wall electrode PX1 that stands on the main surface of the first substrate SUB1 so as to be directed towards the second substrate SUB2 and provides the arrangement where the wall pixel electrode PX surrounds the region of the pixel PXL along the periphery portion of the pixel PXL.

Here, the wall electrode insulating film PAS3 is formed in the border portions with the adjacent pixels PXL, and therefore, the material thereof is not limited to an insulating film having light transmitting properties and may be formed of a light blocking insulating film material, for example. Meanwhile, the pseudo-wall electrode insulating film PAS4 is formed in a region within a pixel through which backlight transmits, and therefore, it is preferable for the structure to be formed of an insulating film material having light transmitting properties.

As is clear from FIG. 2, in the pixel structure according to the first embodiment, at least either the wall pixel electrode PX or the pseudo-wall common electrode CT is formed in the region where the pixel PXL is formed and through which backlight transmits, and therefore, the wall pixel electrode PX and the pseudo-wall common electrode CT in the structure are both formed of a transparent conductive film material, such as ITO or AZO.

In addition, in the pixel structure according to the first embodiment, as shown in FIG. 2, when the length between the periphery portion of the wall electrode insulating film PAS3 on the common electrode CT1 side and the periphery portion of the pseudo-wall electrode insulating film PAS4 on the side close to the wall pixel electrode PX is k and the length of the plane electrode PXC running in the direction towards the common electrode CT1, which is the plane portion of the wall pixel electrode PX running in the direction within a plane of the first substrate SUB1, is L, the length of the plane electrode PXC is in such a range as k/2≤L≤k.

Furthermore, when the height of the wall electrode PX1, which is the electrode formed on the sidewall of the wall electrode insulating film PAS3 from among the electrodes that form the wall pixel electrodes PX in the direction of the thickness of the liquid crystal, is s and the height (thickness) of the wall electrode insulating film PAS3 is h, the height s of the wall electrode PX1 is in a range of 0≤s≤h.

(Distribution of Electrical Field in Pixel Region)

Figure 4A:
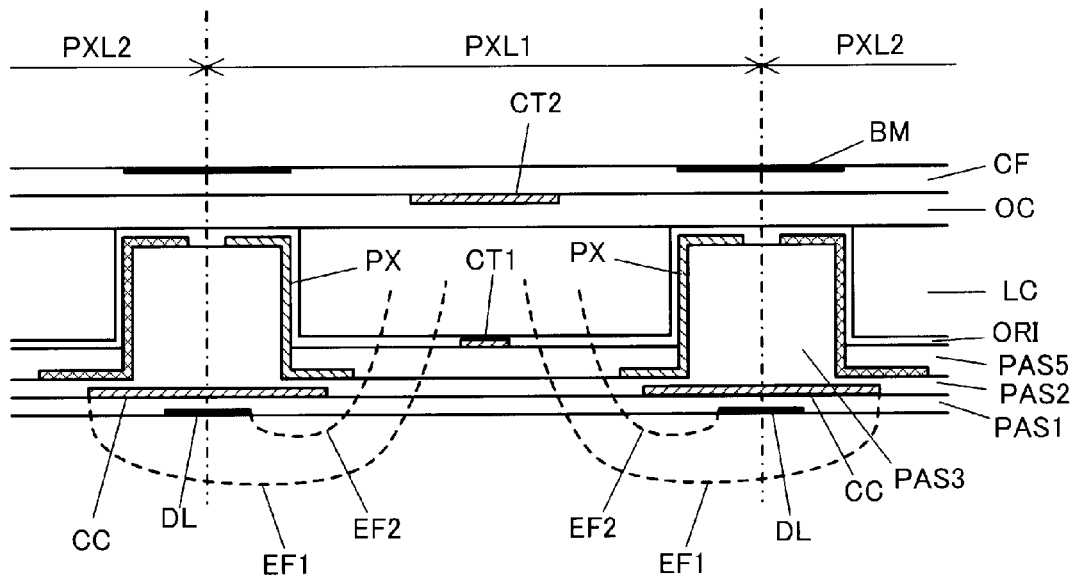
FIGS. 4A and 4B are diagrams for illustrating the distribution of an electrical field when black is displayed in the liquid crystal display device according to the first embodiment of the present invention.
Figure 4B:
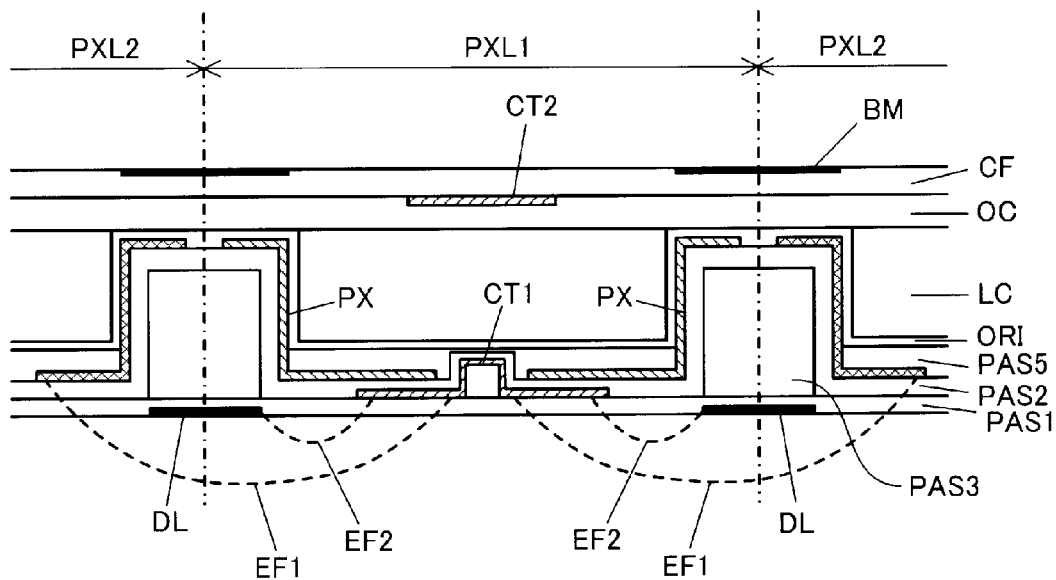
Figure 5A:
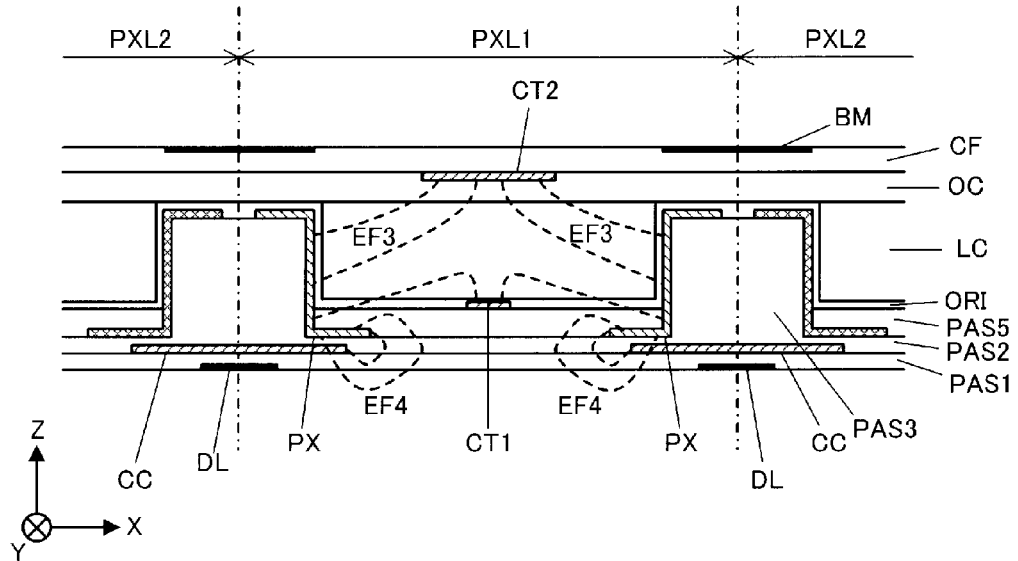
FIGS. 5A and 5B are diagrams for illustrating the distribution of an electrical field when white is displayed in the liquid crystal display device according to the first embodiment of the present invention.
Figure 5B:
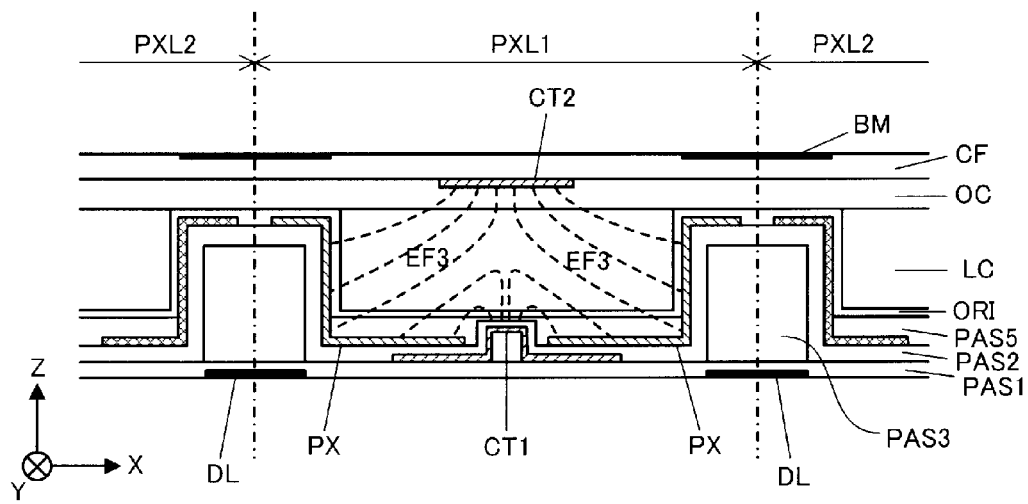

Next, FIGS. 4A and 4B are diagrams for illustrating the distribution of the electrical field in the liquid crystal display device according to the first embodiment of the present invention when black is displayed. FIGS. 5A and 5B are diagrams for illustrating the distribution of the electrical field in the liquid crystal display device according to the first embodiment of the present invention when white is displayed. In the following, the distribution of the electrical field when black is displayed and when white is displayed is described in reference to FIGS. 4A to 5B. Here, FIGS. 4A and 5A show the distribution of the lines of electrical force in the case where a pseudo-wall common electrode CT is formed by providing both the first substrate SUB1 and the second substrate SUB2 with only a linear common electrode, and FIGS. 4B and 5B show the distribution of the lines of electrical force in the structure according to the first embodiment. In addition, as described above, the liquid crystal display device according to the first embodiment is formed so that the display mode is normally black, and therefore, no electrical field is applied between the wall pixel electrode PX and the pseudo-wall common electrode CT when black is displayed, and the maximum electrical field is applied when white is displayed. In addition, in FIGS. 4A to 5B, the first substrate SUB1 and the second substrate SUB2 are omitted.

In FIGS. 4A and 4B, in the case where black is displayed in the pixel PXL1 at the center in the FIGS. 4A and 4B and white is displayed in the pixels PXL2 that are adjacent to this pixel displaying black in the X direction, the same voltage (for example, 0 V as a reference voltage) is applied to the wall pixel electrode PX and the common electrodes CT1, CT2, respectively, in the pixel PXL1 displaying black. Meanwhile, a gradation voltage corresponding to white display is applied to the pixel electrode PX in the adjacent pixels PXL2 that are pixels displaying white. Furthermore, a predetermined gradation signal is supplied to the drain line DL in the layer beneath the wall electrode insulating film PAS3, that is to say, the drain line DL formed on the first substrate SUB1 of the wall electrode insulating film PAS3.

As a result, as shown in FIG. 4B, in the structure according to the first embodiment, the lines of electrical force indicated by the dotted lines in the figure are caused between the common electrode CT1 of the pixel PXL1 for displaying black and the wall pixel electrode PX of the adjacent pixels PXL2, and thus, these lines of electrical force EF1 are generated in the first substrate SUB1 where the structure prevents the electrical field from being applied to the liquid crystal LC in the pixel PXL1 for displaying black. Furthermore, the lines of electrical force EF2 are generated as indicated by the dotted lines between the common electrode CT1 of the pixel PXL1 for displaying black and the drain lines DL, and thus, these lines of electrical force EF2 are also caused in the first substrate SUB1 where the structure prevents the electrical field from being applied to the liquid crystal LC in the pixel PXL1 for displaying black.

In contrast, as shown in FIG. 4A, in the case where the first substrate SUB1 and the second substrate SUB2 are provided with common electrodes CT1 and CT2 in linear form, respectively, and pseudo-wall common electrodes CT are formed of these common electrodes in linear form, a region where are no electrodes is created between the wall pixel electrode PX and the pseudo-wall common electrode CT. As a result, the lines of electrical force EF1, EF2 generated from the potential in the signal wire and the wall pixel electrodes PX in the adjacent pixels PXL2 enter into the liquid crystal layer LC in the pixel PXL1, and therefore, the black display mode efficiency increases.

As described above, in the pixel structure according to the first embodiment, the plane common electrode CTC, which runs to form a common electrode CT1, functions as a blocking electrode for blocking the electrical field from the adjacent pixels PXL2. Accordingly, even when the common electrode CT1 provided on the first substrate SUB1 side and the common electrode CT2 provided on the second substrate SUB2 form a pseudo-wall electrode CT in the structure, an electrical field generated between the pseudo-wall electrode CT of the pixel PXL1 when black is displayed and the adjacent pixels PXL 2 or the drain lines DL (indicated by lines of electrical force EF1, EF2) can be prevented from reaching the liquid crystal layer LC, and therefore, the display mode efficiency can be lowered (increased) when black is displayed.

In the pixel structure according to the first embodiment of the present invention, the plane electrode PXC or the plane common electrode CTC that forms the wall pixel electrode PX always exists in the region between the wall pixel electrode PX and the pseudo-wall common electrode CT, and therefore, the liquid crystal layer LC is not affected. Accordingly, in the pixel structure according to the first embodiment, the black display mode efficiency can be completely prevented from increasing due to the effects of the potential in the signal wires and the adjacent pixels PXL2 in proximity.

In addition, as shown in FIGS. 5A and 5B, in the case where white is displayed in the pixel PXL1 at the center and black is displayed in the pixels PXL2 adjacent to this pixel PXL1, a gradation voltage corresponding to white display is applied to the wall pixel electrode PX in the pixel PXL1 for displaying white. At this time, a reference voltage is applied to both the common electrodes CT1 and CT2. A pseudo-wall common electrode CT is formed in the region between the common electrode CT1 and the common electrode CT2.

Accordingly, as shown in FIG. 5B, in the pixel structure according to the first embodiment, the lines of electrical force EF3 indicated by the dotted lines are generated between the wall pixel electrode PX and the common electrodes CT1, CT2, and liquid crystal molecules in the liquid crystal layer LC are driven in accordance with the electrical field indicated by these lines of electrical force EF3 so that white images are displayed. At this time, in the pixel structure according to the first embodiment, lines of electrical force EF3 are generated from the plane electrode PXC formed along the main surface of the first substrate SUB1 within the electrodes that form the wall pixel electrodes PX. Accordingly, an electrical field indicated by the lines of electrical force EF3 is generated between the wall pixel electrode PX and the pseudo-wall common electrode CT in proximity to the common electrode CT1.

As described above, in the pixel structure according to the first embodiment, the plane electrode PXC that forms the wall pixel electrode PX is a blocking electrode for blocking the electrical field from the pixel electrode PX to the adjacent pixel PXL2. Accordingly, even in the structure where the common electrode CT1 provided on the first substrate SUB1 side and the common electrode CT2 provided on the second substrate SUB2 side form a pseudo-wall electrode CT, and at the same time, a pair of pixel electrodes PX are formed with the pseudo-wall common electrode CT in between, an electrical field from an adjacent pixel or a signal line in proximity can be prevented from being applied to the liquid crystal molecules within the pixel PXL by coming around from the first substrate SUB1 side.

In the pixel structure according to the first embodiment, the other end of the plane electrode PXC that runs from the lower end side of the wall pixel electrode PX runs long to the proximity of the pseudo-wall common electrode CT, and therefore, most of the lines of electrical force EF3 generated from the plane electrode PXC are directed to the pseudo-wall common electrode CT. Accordingly, when the present invention is applied, the intensity of the electrical field between the wall pixel electrode PX and the pseudo-wall common electrode CT can be made uniform so that the white display mode efficiency can be prevented from lowering and the white display mode efficiency can be increased.

Here, the plane common electrode CTC is formed in a layer beneath the plane electrode PXC with an insulating film PAS2 in between, and therefore, an electrical field is generated between the plane electrode PXC and the plane common electrode CTC. At this time, the electrical field is created in the capacitor Cst, that is to say, the electrical field is generated through the insulating film PAS2. Accordingly, this electrical field does not affect the driving of the liquid crystal molecules in the liquid crystal layer LC, and therefore, the display mode efficiency is not affected when white is displayed.

At this time, in the structure shown in FIG. 5A, the amount of the running plane electrode (the amount of protrusion) is very small as compared to the distance between the wall pixel electrode PX and the common electrode CT1 in the structure. Accordingly, the wall pixel electrode PX and the pseudo-wall common electrode CT having this structure provide the lines of electrical force EF3 directed to the pseudo-wall common electrode CT from the wall pixel electrode PX and the lines of electrical force EF4 starting from the wall pixel electrode PX and reaching the signal line in proximity to the pixel PXL1. Therefore, in the structure shown in FIG. 5A, the transmittance lowers when white is displayed, and thus, it is possible to increase the display mode efficiency (transmittance) greatly when the pixel structure according to the first embodiment is compared to the pixel structure shown in FIG. 5A.

As shown in FIG. 5A, in the case where a pseudo-wall common electrode CT is formed of a pair of common electrodes CT1, CT2 in linear form, there is a region where there are no electrodes between the plane electrode PXC that forms the wall pixel electrode PX and the electrode on the TFT that forms the common electrode CT1. Furthermore, in the pixel structure shown in FIG. 5A, it is necessary to form an electrode CC for a capacitor in a layer beneath the plane electrode PXC, and therefore, the lines of electrical force generated from the wall pixel electrode PX are directed not only to the pseudo-wall common electrode CT, but also to the electrode CC for forming this capacitor. Thus, in the pixel structure shown in FIG. 5A, the density of the lines of electrical force EF4 is high in proximity to the wall pixel electrode PX and low in proximity to the pseudo-wall common electrode CT, and therefore, the distribution of the intensity of the electrical field is uneven within the pixel, which lowers the white display mode efficiency.

In the above-described pixel structure shown in FIG. 5A, the number of layers between the insulating film (interlayer insulating film) PAS1 and the alignment film ORI in layers above the signal wires on the first substrate SUB1 is 8, while it is 7 in the pixel structure according to the first embodiment shown in FIG. 5B. Accordingly, the pixel structure according to the present invention can be provided with a capacitor Cst while reducing the number of layers as compared to the pixel structure shown in FIGS. 5A and 5B, and thus, specific effects can be gained such that the manufacturing costs for the liquid crystal display device can be greatly reduced.

Figure 6:
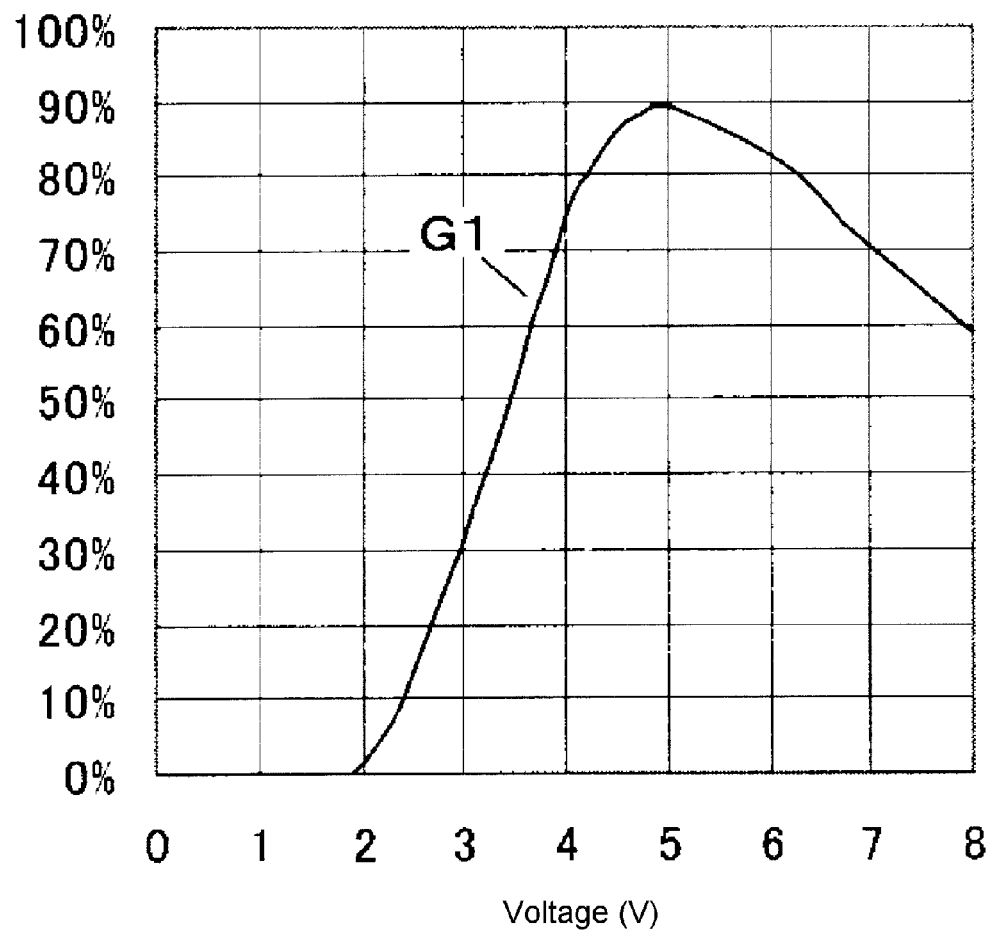
FIG. 6 is a graph for illustrating the relationship between the voltage and the display mode efficiency in the liquid crystal display device according to the first embodiment of the present invention.
Figure 7:
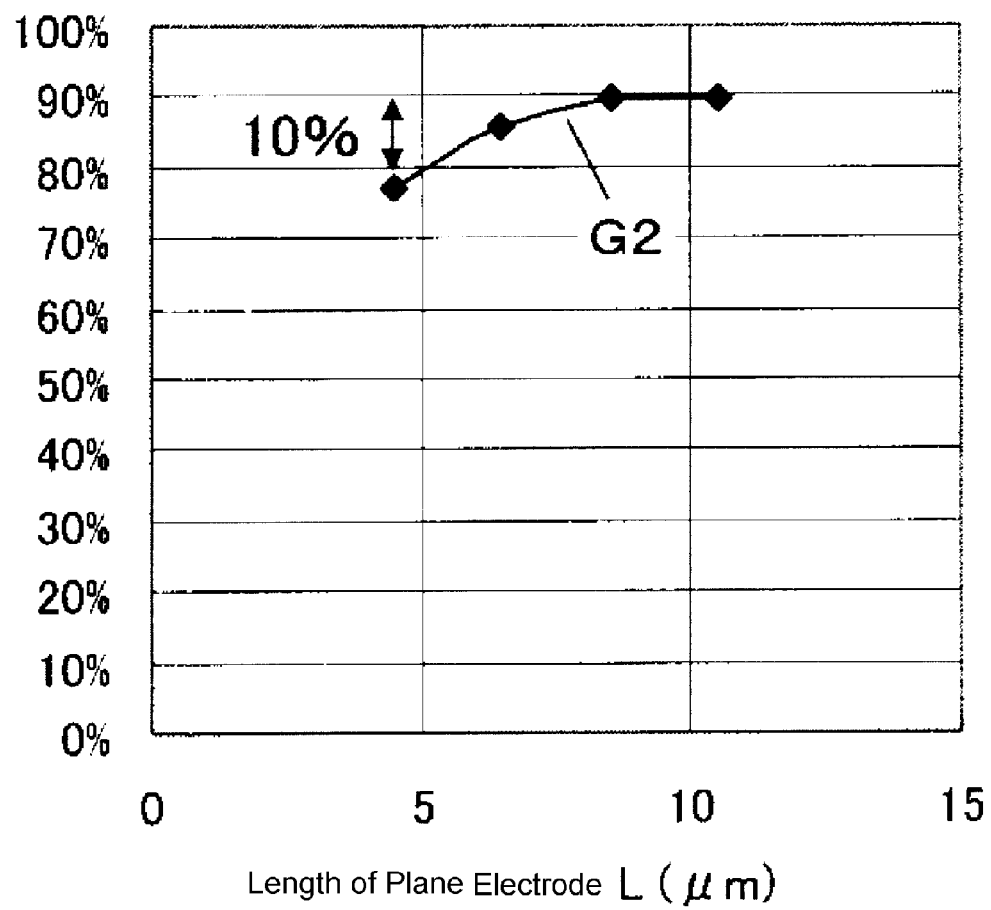
FIG. 7 is a graph for illustrating the relationship between the length of a plane electrode and the display mode efficiency in the liquid crystal display device according to the first embodiment of the present invention.

Next, FIG. 6 is a graph for illustrating the relationship between the voltage and the display mode efficiency in a liquid crystal display device according to the first embodiment of the present invention. FIG. 7 is a graph for illustrating the relationship between the length of the plane electrode and the display mode efficiency in the liquid crystal display device according to the first embodiment of the present invention. In the following, the effects of improving the display mode efficiency in the liquid crystal display device according to the first embodiment are described in detail in reference to FIGS. 6 and 7. Here, in the pixel structure regarding FIG. 6, the width of the pixel, that is to say, the width of the pixel along the short sides, is 29 μm, and the height s of the wall electrode, the width of the wall electrode and the length L of the plane electrode are 6 μm, 6 μm and 8.5 μm, respectively, and the film thickness of the insulating film PAS5 between the plane electrode PXC in plate form and the liquid crystal layer LC is 2.6 μm. In addition, the curve G1 shown in FIG. 6 simulates the voltage in the worst case where dot inversion driving that greatly affects the potential around the pixel is assumed. Typically, the potential of the adjacent pixels is −5 V and the potential in the signal wire is +/−5 V where the polarity is inverted alternately.

As is clear from the curve G1 shown in FIG. 6, even in the case where there is a potential around the pixel where dot inversion driving is assumed, the black display mode efficiency in the pixel structure according to the first embodiment is equal to the orthogonal transmittance of the polarizing plate, while it is clear that the white display mode efficiency at approximately 90% can be achieved, which is equal to that of the structure in the patent previously applied for by the present applicant.

It is clear from the results that the display mode efficiency of the IPS type, where liquid crystal molecules are driven by an electrical field that is parallel to the surface of the substrate, could increase to approximately 90% while completely blocking the effects from the potential around the pixel if the present invention is applied.

The curve G2 shown in FIG. 7 shows the relationship between the length of the plane electrode and the display mode efficiency in the pixel structure according to the first embodiment. Here, the curve G2 shown in FIG. 7 comes from the results of measurement of the display mode efficiency in the case where the width of the pixel is 29 μm, the width of the wall electrode is 6 μm, and the length L of the plane electrode PXC is varied. In addition, in FIG. 7, in the case where the length L of the electrode of the pixel holding electrode PXC is 10.5 μm, the pseudo-wall electrode insulating film PAS4 for forming the common electrode CT1 can be gained. In addition, the curve G2 shown in FIG. 7 comes from the results of measurement in the case where the plane common electrode CTC, which is the other electrode from among a pair of electrodes that form a capacitor Cst, does not depend on the length of the plane electrode PXC, and there is always a plane common electrode CTC between the wall pixel electrode PX and the pseudo-wall electrode CT.

As is clear from FIG. 7, in the pixel structure according to the first embodiment, the display mode efficiency is approximately 90% in the region where the length L of the plane electrode PXC starting from the peripheral portion of the wall electrode PX1 that forms the wall pixel electrode PX is 8 μm or more. Meanwhile, in the region where the length L of the plane electrode PXC is 8 μm or less, the display mode efficiency gradually lowers as the length L of the plane electrode PXC decreases. In particular, in the case where the length L of the plane electrode PXC is 5 μm, the display mode efficiency is approximately 80%, which is approximately 10% lower than the display mode efficiency in the case where the length L of the plane electrode PXC is 8 μm or more. Furthermore, in the case where the length L of the plane electrode PXC is approximately 4.5 μm, the display mode efficiency lowers to 77%.

The display mode efficiency lowers in the case where the length L of the plane electrode PXC is short because the length of the plane common electrode CTC that is exposed on the liquid crystal layer LC side becomes longer as the length of the plane electrode PXC decreases, and therefore, an electrical field concentrates between the plane electrode PXC, which is the source electrode (wall pixel electrode), and the plane common electrode CTC, which is the common electrode CT1, and thus, the electrical field from the pseudo-wall common electrode CT becomes very weak, which consequently makes it difficult for the liquid crystal LC to move. Accordingly, in the case where the plane common electrode CTC is placed on the plane electrode PXC on the first substrate SUB1 side, it is effective for the plane electrode PXC to be long enough to reach the proximity of the common electrode CT1 that forms a pseudo-wall common electrode CT. In particular, it is preferable for the decreasing rate of the display mode efficiency to be as small as possible, and it is desirable for it to be 10% or less, and therefore, it is preferable for the length of the plane electrode PXC to be 5 μm or more in the structure according to the first embodiment.

As a result, as shown in FIG. 2, the length of the plane electrode PXC that makes the decreasing rate of the display mode efficiency be 10% or less is k/2 μm when the length between the peripheral portion of the wall electrode insulating film PAS3 on the common electrode CT1 side and the periphery portion of the pseudo-wall electrode insulating film PAS4 on the side close to the wall pixel electrode PX is k. Accordingly, it is desirable for the length L of the plane electrode PXC that runs in a direction in a plane of the first substrate SUB1 to be in a range of k/2≤L≤k.

As described above, the liquid crystal display device according to the first embodiment has such a structure that a pair of wall pixel electrodes PX that run along the periphery portions, which face each other and are in the longitudinal direction of the pixel region, and common electrodes CT1 and CT2, which are formed between this pair of wall pixel electrodes PX and run in the longitudinal direction of the pixels PXL, are provided, the wall pixel electrodes PX are formed of a wall electrode PX1 that is formed to stand on the first substrate SUB1 towards the second substrate SUB2 and a plane electrode PXC that runs from the periphery portion of the wall electrode PX1 on the first substrate SUB1 side in a direction in a plane of the first substrate SUB1 towards the common electrode CT1, the common electrode CT1 is formed of a pseudo-wall electrode insulating film PAS4 in columnar form (wall form) that is formed on the first substrate SUB1 on the liquid crystal side and runs in the direction in which the wall electrode PX1 runs, a wall common electrode CTW that covers the surfaces on the side and the top of the pseudo-wall electrode insulating film PAS4, and a plane common electrode CTC that runs from the periphery portion of this wall common electrode CTW on the first substrate SUB1 side in a direction in a plane of the first substrate SUB1 towards the wall electrode PX1, and the plane electrode PXC and the plane common electrode CTC are layered on top of each other with an insulating film PAS2 in between so that a capacitor Cst of the pixel PXL is formed, and therefore, a capacitor Cst can be formed without separately providing electrodes for forming a capacitor Cst in the peripheral portions of the pixel region, and thus, it is possible to reduce the number of thin film layers for forming pixels, and the number of steps required for the manufacture of the liquid crystal display device can be reduced so that the cost of the liquid crystal display device can be lowered.

In particular, in the structure of the pixel PXL according to the first embodiment, common electrodes CT2 in linear form are formed on the second substrate SUB2 in such locations as to overlap the wall common electrodes CTW as viewed from the display side, and at the same time, a common signal is supplied to the common electrodes CT2 so that pseudo-wall common electrodes CT are formed in regions between the wall common electrodes CTW and the common electrode CT2 in linear form. In addition, the capacitor Cst is formed of the plane electrode PXC and the plane common electrode CTC, and the plane electrode PXC is formed on the side closer to the liquid crystal layer LC, that is to say, in an upper layer, while the plane common electrode CXC is formed on the side further away from the liquid crystal layer, that is to say, in a lower layer, in the structure. Furthermore, at least either the plane electrode PXC or the plane common electrode CTC is provided within the region through which backlight transmits in the region of the pixel PXL, and therefore, the display mode efficiency at approximately 90% can be achieved while completely blocking the potential around the pixel, such as the potential in the signal wire, for example, the drain line DL, and the potential in the adjacent pixels. Thus, the effects from the potential around the pixel can be suppressed, and therefore, the contrast ratio of the liquid crystal panel can be prevented from lowering and the display mode efficiency can be increased.

That is to say, such effects can be gained that the black display mode efficiency can be prevented from increasing due to the effects of the potential around the pixel and the white display mode efficiency can be prevented from lowering.

Figure 8:
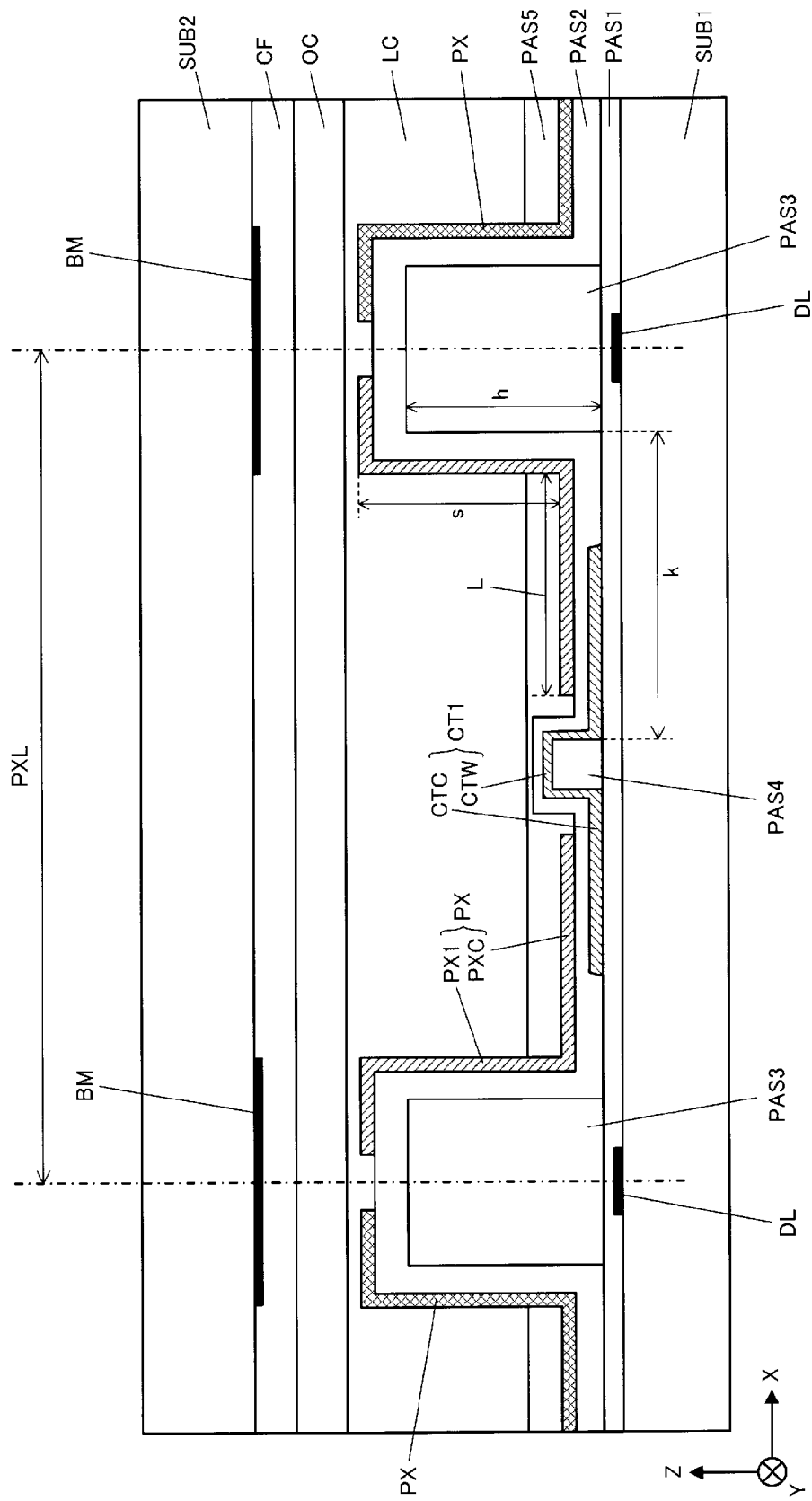
FIG. 8 is a cross-sectional diagram for illustrating the structure of a pixel in another liquid crystal display device according to the first embodiment of the present invention.

In addition, though the above-described liquid crystal display device according to the first embodiment has such a structure that a common electrode CT2 in linear form is formed on the second substrate SUB2 on the liquid crystal layer LC side so that a pseudo-wall electrode (pseudo-wall common electrode CT) for providing a uniform electrical field is formed in the region between the common electrode CT2 and the common electrode CT1 formed on the first substrate SUB1 with the liquid crystal layer LC in between, the present invention is not limited to this structure. As shown in FIG. 8, the wall pixel electrode PX and the common electrode CT1 may be formed only on the first substrate SUB1 side, for example.

Another liquid crystal display device according to the first embodiment of the present invention shown in FIG. 8 has the same pixel structure as the liquid crystal display device according to the first embodiment shown in FIG. 2, except that the common electrode CT2 is not formed on the second substrate SUB2. That is to say, in the other pixel structure according to the first embodiment, the wall pixel electrode PX formed on the first substrate SUB1 on the liquid crystal layer LC side is provided with a pixel holding electrode PXC that runs from the wall pixel electrode PX in the direction in which the common electrode CT1 is formed. Meanwhile, the common electrode CT1 is also provided with a plane common electrode CTC that runs from the common electrode CT1 in the direction in which the wall pixel electrode PX is formed. At this time, the plane common electrode CTC has such a structure as to be formed in a layer closer to the first substrate SUB1 than the plane electrode PXC, that is to say, in a layer further away from the liquid crystal layer LC, and therefore, the display mode efficiency can be lowered (increased) when black is displayed, and at the same time, the display mode efficiency can be increased (lowered) when white is displayed as in the above-described liquid crystal display device according to the first embodiment.

Second Embodiment

Figure 9:
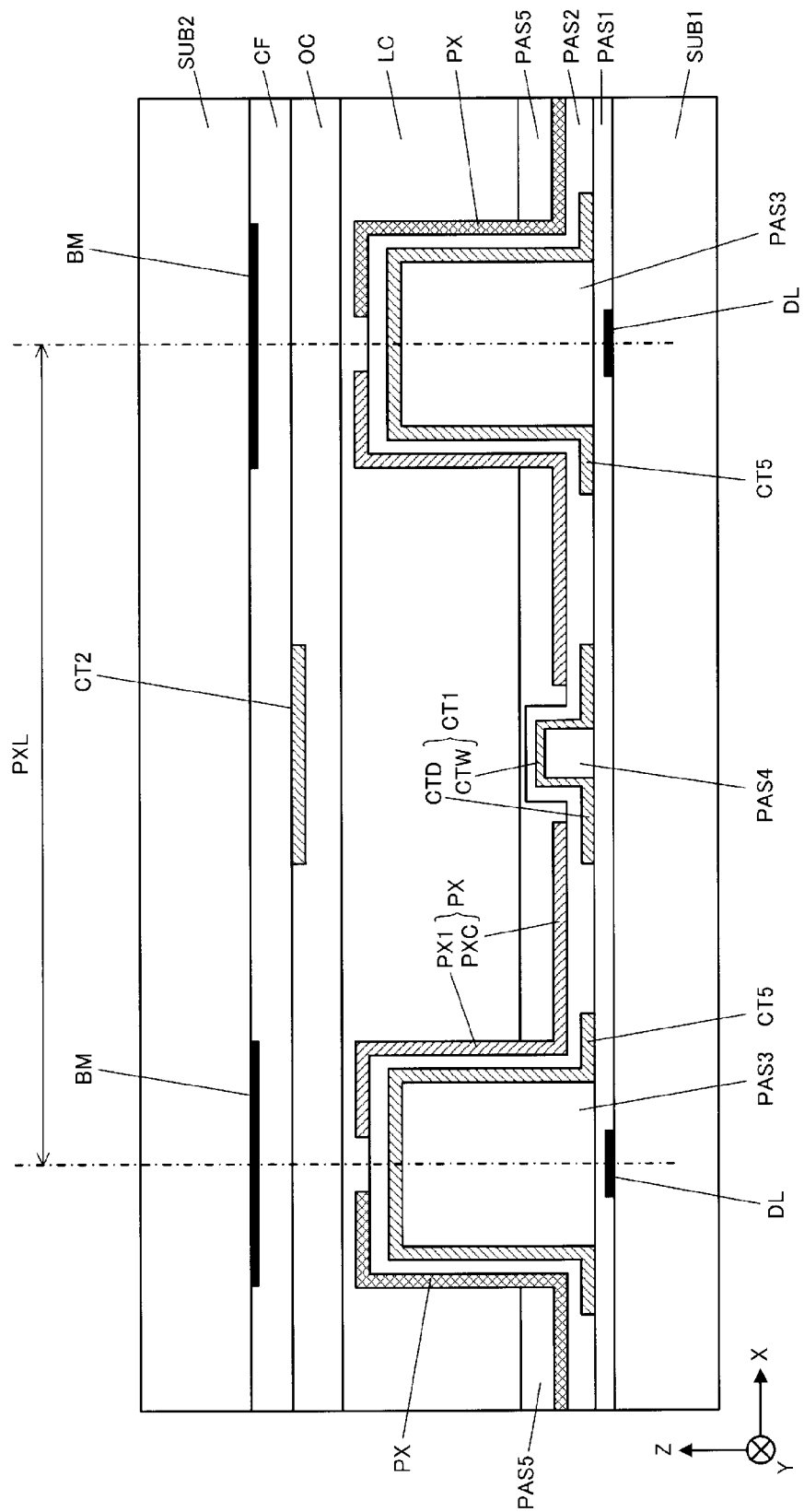
FIG. 9 is a cross-sectional diagram for schematically illustrating the structure of a liquid crystal display device according to the second embodiment of the present invention.

FIG. 9 is a cross-sectional diagram for schematically illustrating the structure of a liquid crystal display device according to the second embodiment of the present invention. The cross-sectional diagram in FIG. 9 corresponds to the cross-sectional diagram in FIG. 2 showing the first embodiment. Here, the liquid crystal display device according to the second embodiment has the same structure as in the first embodiment, except that the location in which the capacitor Cst is formed is different. Accordingly, in the following, a pair of electrodes that form the capacitor Cst is described in detail.

As shown in FIG. 9, the pixel structure in the liquid crystal display device according to the second embodiment has an electrode (second wall electrode) CT5 formed on a wall electrode insulating film PAS3 in pillar form on which the wall pixel electrode PX is formed, and thus, the capacitor Cst is formed.

That is to say, the common electrode CT1 for forming the pseudo-wall electrode CT in the second embodiment is formed of the wall common electrode CTW that covers the surfaces on a side and the top of the pseudo-wall electrode insulating film PAS4 that runs in the Y direction in the figure and the plane electrode (extending portion) CTD that runs from the periphery portion of the wall common electrode CTW by a predetermined amount in a direction in a plane of the first substrate SUB1 and in the direction in which the wall pixel electrode PX is formed. At this time, in the pixel structure according to the second embodiment, the capacitor Cst is not formed in the region through which backlight transmits within the pixel (pixel display region), and therefore, the extending portion of the plane electrode CTD does not cover this transmission region in the structure.

Meanwhile, the wall electrode insulating film PAS3 that runs at least in the Y direction is formed in the bordering portions between pixels, and a conductive film (capacitor electrode) CT5 is formed so as to cover the surfaces on a side and the top of the wall electrode insulating film PAS3. The capacitor electrode CT5 has an extending portion that runs from its peripheral portion in a direction in a plane of the first substrate SUB1 in the structure. This third electrode CT5 is electrically connected to a common signal line CL, not shown, so as to be kept at the same potential as the common electrodes CT1 and CT2. This capacitor electrode CT5 in the second embodiment is formed in the same layer as the common electrode CT1, which makes it possible to reduce the number of steps as in the first embodiment, but they may not be limited to be in the same layer.

In addition, an insulating film PAS2 is formed in a layer above the capacitor electrode CT5 so as to cover the surface thereof, and the structure allows the insulating film PAS2 to cover the upper surface of the common electrode CT1, and a wall pixel electrode PX is formed on the upper surface of the wall electrode insulating film PAS3. At this time, in the region where the wall pixel electrode PX is formed, the capacitor electrode CT5 and the insulating film PAS2 are formed along the contour of the surface of a side and the top of the wall electrode insulating film PAS3. Accordingly, the wall pixel electrode PX in the second embodiment also protrudes towards the second substrate SUB2, and at the same time, a wall electrode PX1 that runs in the X direction and a plane electrode PXC that runs in a direction in a plane of the first substrate SUB1 are formed. That is to say, the wall pixel electrode PX has the same structure as in the first embodiment and is formed of the wall electrode PX1 formed in the border portion with an adjacent pixel and the plane electrode PXC that runs from the periphery portion of the wall electrode PX1 on the first substrate SUB1 side in a direction in a plane of the first substrate SUB1.

As is clear from FIG. 9, the wall electrode PX1 and the capacitor electrode CT5 that are placed to face each other with the insulating film PAS2 in between form the capacitor Cst in the structure. At this time, the plane electrode PXC that runs from the periphery portion of the wall electrode PX1 on the first substrate SUB1 side also has such a structure as to overlap at its end portion part of the plane electrode for forming the common electrode CT1 and the extending portion that runs from the periphery portion of the capacitor electrode CT5 in a direction in a plane of the first substrate SUB1, and therefore, part of the capacitor CT1 is formed in this overlapping portion.

In the thus-formed pixel structure according to the second embodiment as well, at least either conductive film, the plane electrode PXC for forming the wall pixel electrode PX or the extending portion CTD of the common electrode CT1, covers the region through which backlight transmits within the pixel region. Furthermore, one of the electrodes that form the capacitor Cst is the plane electrode PXC, and the other electrode is formed in a layer beneath the plane electrode PXC, that is to say, on the side closer to the first substrate SUB1, and therefore, the same effects as in the first embodiment can be gained.

Figure 10:
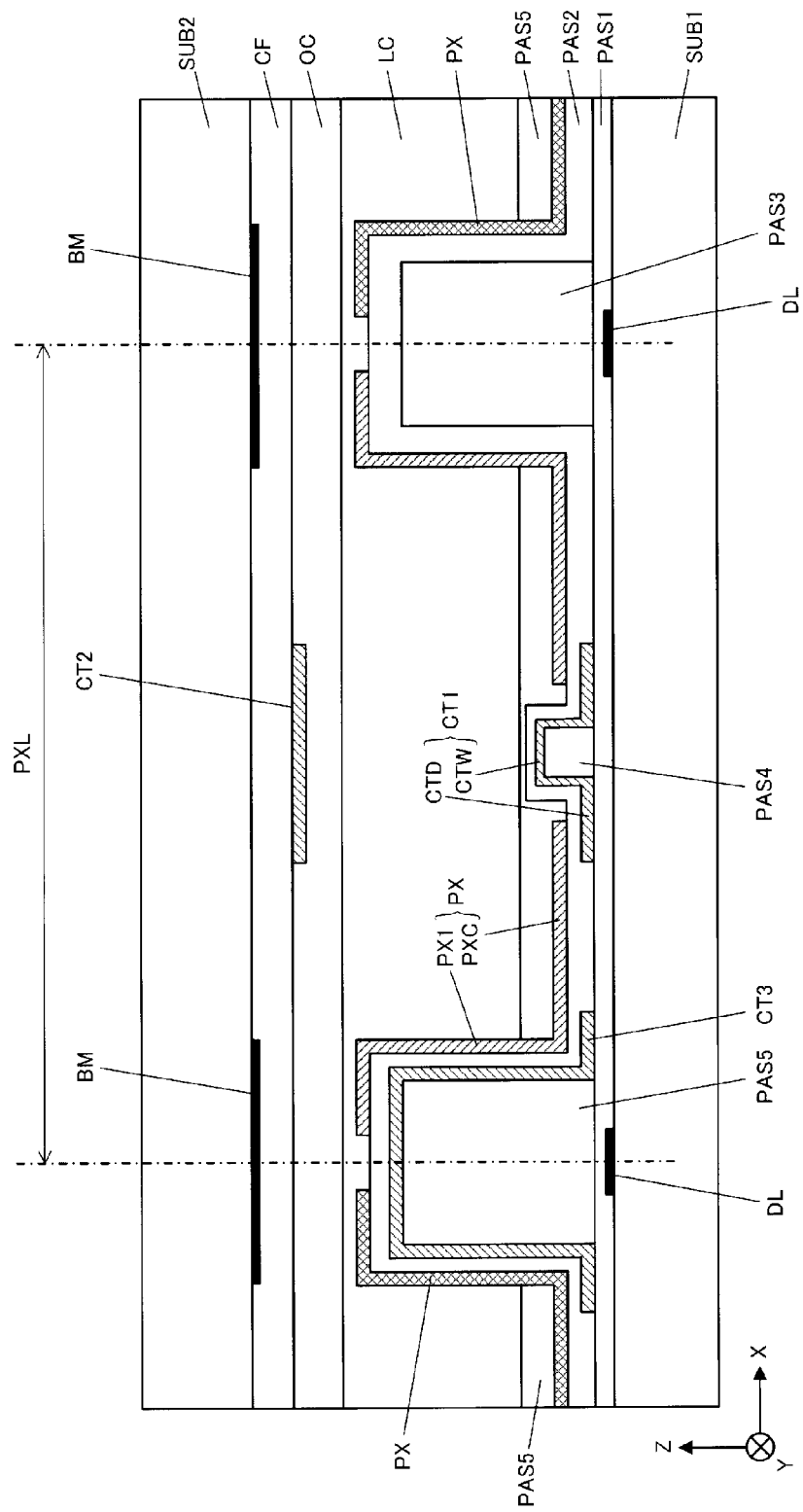
FIG. 10 is a cross-sectional diagram for schematically illustrating the structure of another liquid crystal display device according to the second embodiment of the present invention.

Though in the pixel structure according to the second embodiment, the conductive film is formed in the entirety of the bordering portion with at least the adjacent pixel in the X direction, the structure is not limited to this. As shown in FIG. 10, for example, the conductive film for forming the capacitor electrode CT5 may be formed only in one region from among the regions between the pixel and its adjacent pixels in the X direction. Conventional liquid crystal display devices generally have an even number of pixels that are effective for the display, and therefore, a capacitor electrode CT5 is formed in the border regions between the pixels in the first column and the pixels in the second column while the capacitor electrode CT5 is not formed in the border regions between the pixels in the second column and the pixels in the third column, and thus, the border regions where the capacitor electrode CT5 is formed and the border regions where it is not formed alternate between the pixels aligned in the X direction in the structure, for example.

This structure also has a plane electrode PXC that runs from the wall pixel electrode PX, and therefore, it is possible to gain the above-described effects.

Third Embodiment

Figure 11:
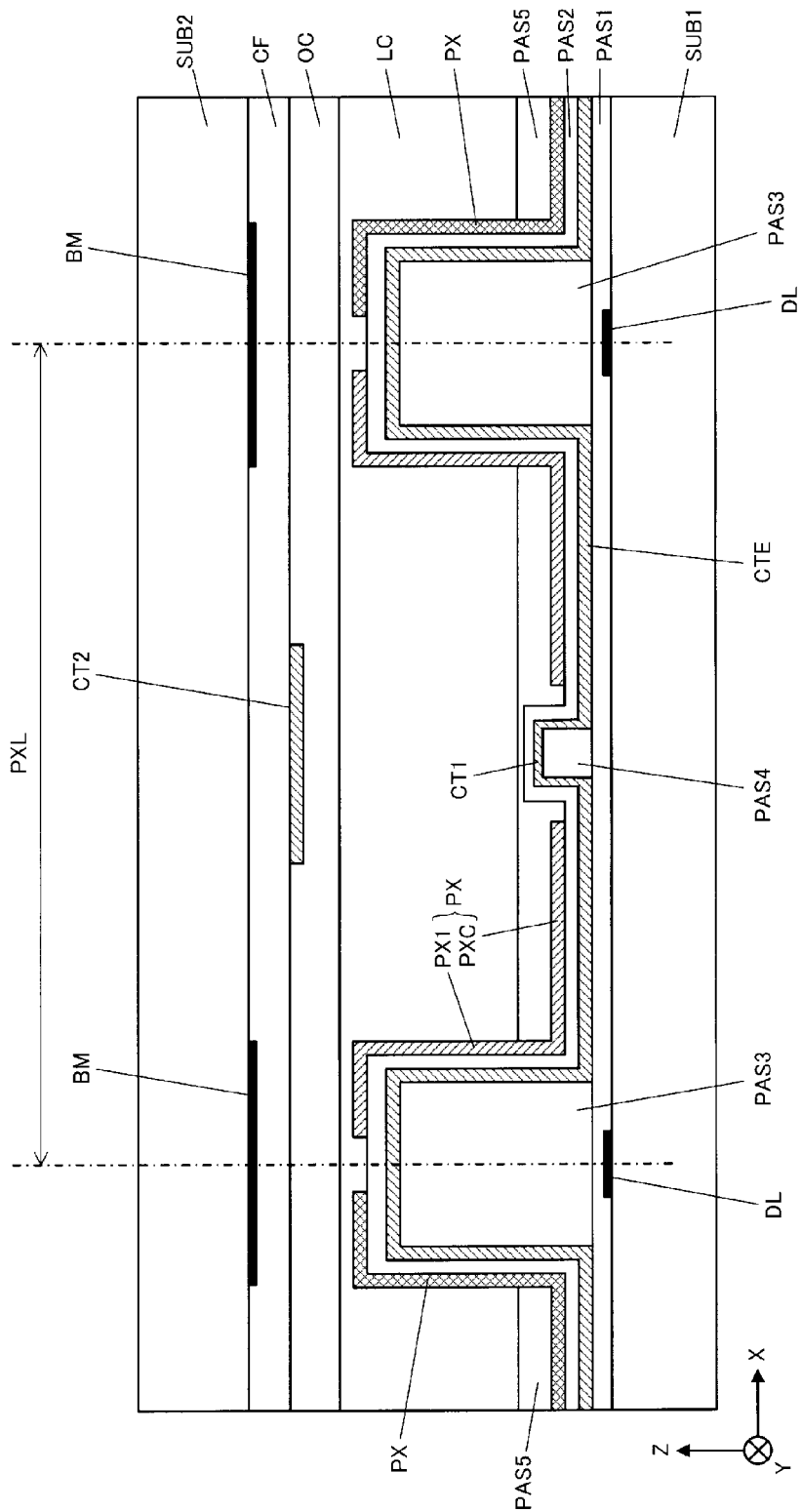
FIG. 11 is a cross-sectional diagram for illustrating the structure of a pixel in a liquid crystal display device according to the third embodiment of the present invention.

FIG. 11 is a cross-sectional diagram for illustrating the pixel structure in a liquid crystal display device according to the third embodiment of the present invention, and the cross-sectional diagram in FIG. 11 corresponds to the cross-sectional diagram in FIG. 2 showing the first embodiment. Here, the liquid crystal display device according to the third embodiment has the same structure as in the first embodiment, except only that the location in which one of the electrodes for forming the capacitor Cst is formed is different. Accordingly, in the following, the pair of electrodes for forming the capacitor Cst is described in detail.

As shown in FIG. 10, in the pixel structure according to the third embodiment, the electrode CTE for forming the capacitor Cst is formed in the region through which backlight transmits and in the region where the wall pixel electrode PX is formed, and thus, the capacitor Cst is formed.

That is to say, the conductive film (transparent conductive film) CTE for forming the common electrode CT1 in the third embodiment is formed so as to cover the upper surface of the insulating film PAS1 as well as the wall electrode insulating film PAS3 and the pseudo-wall insulating film PAS4 that are formed on the upper surface of the insulating film PAS1. That is to say, it has such a form as to cover at least the upper surface of the first substrate SUB1 within the display region.

In a layer above this conductive film CTE, the insulating film PAS2 is formed so as to cover this conductive film CTE, and the wall pixel electrode PX is formed on the upper surface thereof. At this time, the structure of the wall pixel electrode PX is the same as in the first embodiment.

At this time, in the structure of the common electrode CT1 according to the third embodiment, the conductive film CTE is provided so as to cover the surfaces on a side and the top of the pseudo-wall electrode insulating film PAS4 as in the structure of the common electrode CT1 according to the first embodiment, and this conductive film CTE is provided so as to face the pixel holding electrode PXC with the insulating film PAS2 in between. In addition, in the pixel structure according to the third embodiment, as in the liquid crystal display device according to the second embodiment, the conductive film CTE is provided so as to face the wall electrode (sidewall electrode) PX1 for forming the wall pixel electrode PX with the insulating film PAS2 in between in the region where the wall pixel electrode PX is formed. As a result, in the structure according to the third embodiment, the capacitor Cst is formed in almost the entirety of the region where the pixels are formed, and therefore, the same effects as in the first embodiment can be gained.

In the case where the area of the electrode for forming the capacitor Cst that is connected parallel to the liquid crystal layer is too large, however, the capacitor Cst is highly charged, and therefore, a video signal sometimes fails to be written into the pixel electrode PX through the thin film transistor TFT. Accordingly, it is necessary to select an appropriate area for the electrode for the capacitor in order to implement a desired capacitor Cst.

Fourth Embodiment

Figure 12:
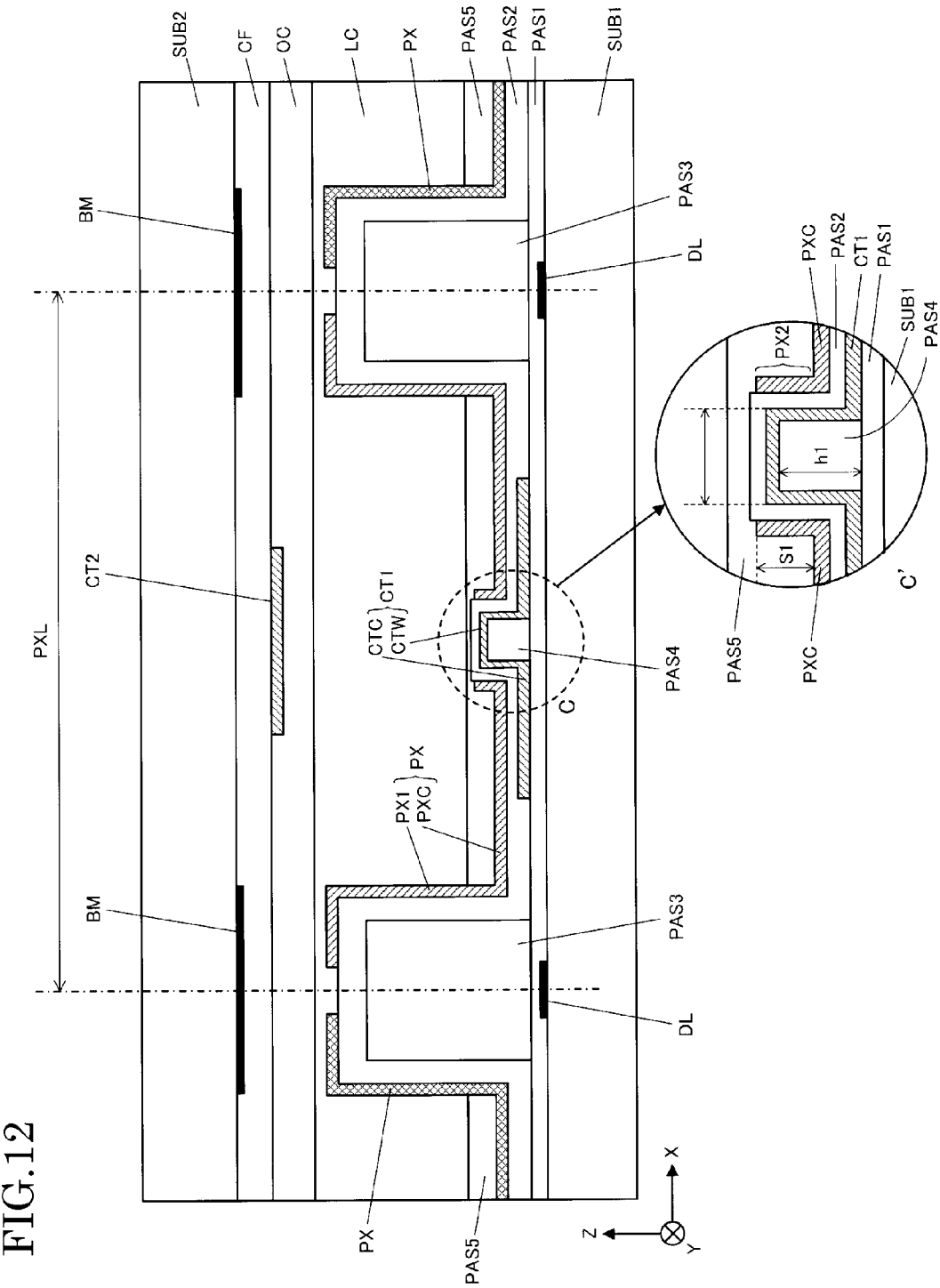
FIG. 12 is a cross-sectional diagram for illustrating the structure of a pixel in a liquid crystal display device according to the fourth embodiment of the present invention.

FIG. 12 is a cross-sectional diagram for illustrating the pixel structure in a liquid crystal display device according to the fourth embodiment of the present invention, and the cross-sectional diagram in FIG. 12 corresponds to the cross-sectional diagram in FIG. 2 showing the first embodiment. Here, the liquid crystal display device according to the fourth embodiment has the same structure as in the first embodiment, except that the location in which one of the electrodes for forming the capacitor Cst is formed is different. Accordingly, in the following, the pair of electrodes for forming the capacitor Cst is described in detail.

As shown in FIG. 12, the liquid crystal display device according to the fourth embodiment has such a structure that the other end of the plane electrode PXC for forming the wall pixel electrode PX reaches the insulating film PAS2, which is formed in a layer above the wall common electrode CT1 so as to cover the common electrode CT1. In addition, in the pixel structure according to the fourth embodiment, as shown in the diagram C' showing the enlargement of the circle C in FIG. 12, an end portion of the pixel holding electrode PXC is formed so as to protrude (run) towards the liquid crystal layer LC side, that is to say, towards the second substrate SUB2 side, along a sidewall surface of the pseudo-wall electrode insulating film PAS4, and thus, the second wall electrode PX2 that becomes an electrode in wall form is formed. That is to say, the pixel structure according to the fourth embodiment is provided with wall electrodes PX1, PX2 along the sidewall surfaces of the pseudo-electrode insulating film PAS3 and the pseudo-wall electrode insulating film PAS4 for forming an electrode in wall form, and at the same time, only the portion of the common electrode CT1 that is formed on the surface of the top of the pseudo-wall electrode insulating film PAS4 is exposed on the liquid crystal layer LC side, that is to say, on the second substrate SUB2 side.

Figure 13A:
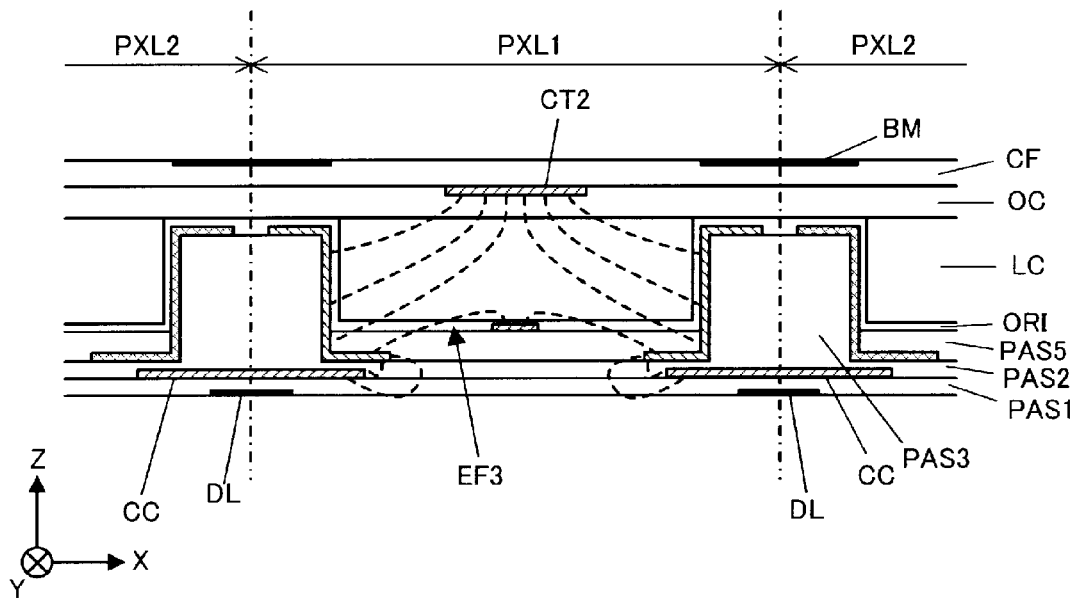
FIGS. 13A and 13B are diagrams showing the distribution of the lines of electrical force in the liquid crystal display device according to the fourth embodiment of the present invention.
Figure 13B:
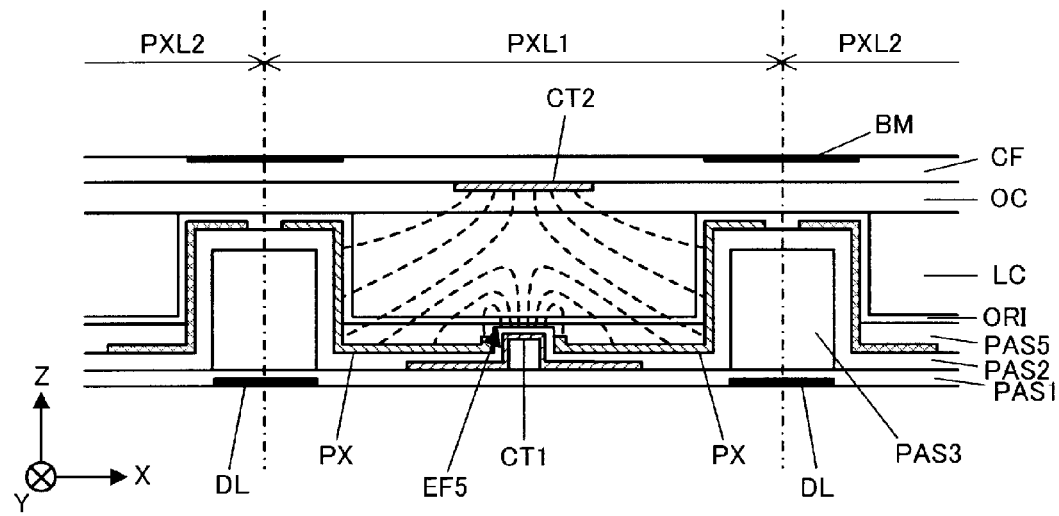

Next, FIGS. 13A and 13B show the distribution of the lines of electrical force in the liquid crystal display device according to the fourth embodiment of the present invention. In the following, the distribution of the electrical field in the liquid crystal layer LC in the pixel structure according to the fourth embodiment is described in reference to FIGS. 13A and 13B. Here, FIG. 13A is a diagram corresponding to FIG. 5A showing the first embodiment, and FIG. 13B is a diagram showing the distribution of the lines of electrical force when white is displayed in the pixel structure according to the fourth embodiment.

As shown in FIG. 13B, in the pixel structure according to the fourth embodiment, the portions excluding the portion formed on the surface on the top of the pseudo-wall electrode insulating film PAS4 for forming the common electrode CT1 face the conductive film for forming the wall pixel electrode PX with the insulating film PAS2 in between. That is to say, in the pixel structure according to the fourth embodiment, only the portion of the common electrode CT1 formed on the surface on the top of the pseudo-wall electrode insulating film PAS4 is exposed from the plane electrode PXC for forming the wall pixel electrode PX on the liquid crystal layer LC side, and the other electrode portions are located on the first substrate SUB1 side relative to the plane electrode PXC. Accordingly, as shown in FIG. 13B, in the pixel structure according to the fourth embodiment, the common electrode CT1 is provided along the second wall electrode PX2 with only a distance of a film thickness of the insulating film PAS2, which is a thin interlayer insulating film, in between, and therefore, very dense lines of electrical force EF5 are generated between the second wall electrode PX2 and the common electrode CT1, and as a result, an intense electrical field can be gained between the second wall electrode PX2 and the common electrode CT1. This intense electrical field makes the liquid crystal LC on the pseudo-wall common electrode CT move easily, and therefore, the pixel structure according to the fourth embodiment can gain a display mode efficiency that is higher than that in the pixel structure shown in FIG. 13A. Here, it is desirable for the height s1 of the second wall electrode PX2 to be in a range of 0≤s1<h1 when the height s1 of the second wall electrode PX2 is the length between the pixel holding electrode PXC on one end side of the second wall electrode PX2 and the liquid crystal layer LC on the other end side, and the height of the pseudo-wall electrode insulating film PAS4 on which the pseudo-wall common electrode CT1 is formed is h1. In addition, the common electrode CT1 is formed in a layer beneath the second wall electrode PX2 with the insulating film PAS2 in between in the structure, and therefore, the film thickness of the insulating film PAS2, that is to say, the layer between the second wall electrode PX2 and the common electrode CT1, can be made thin so that an intense electrical field can be generated between the two electrodes.

In the case where a pair of common electrodes CT1, CT2 in linear form shown in FIG. 13A form a pseudo-wall common electrode CT, the distribution of the lines of electrical force EF3 is sparse in proximity to the common electrode CT1 formed on the first substrate SUB1. Contrarily, in the pixel structure according to the fourth embodiment, many lines of electrical force that reach the common electrode CT1 after passing through the liquid crystal layer LC approximately parallel to the surface of the first substrate SUB1 can be generated even though they are lines of electrical force in proximity to the common electrode CT1 from among the lines of electrical force EF5 starting from the wall pixel electrode PX and reaching the common electrode CT1. Accordingly, the electrical field in a direction in a plane of the first substrate SUB1 can be intensified in proximity to the common electrode CT1, and therefore, such specific effects can be gained that it is possible to drive the liquid crystal molecules even in the region on the common electrode CT1, which is the region where the pseudo-wall common electrode CT is formed, and furthermore, the display mode efficiency can be increased.

Moreover, the liquid crystal display device according to the fourth embodiment is provided with a plane electrode PXC that runs from the wall electrode PX1 and a plane common electrode CTC as in the first embodiment, and therefore, the same effects as in the first embodiment can be gained.

Fifth Embodiment

Figure 14:
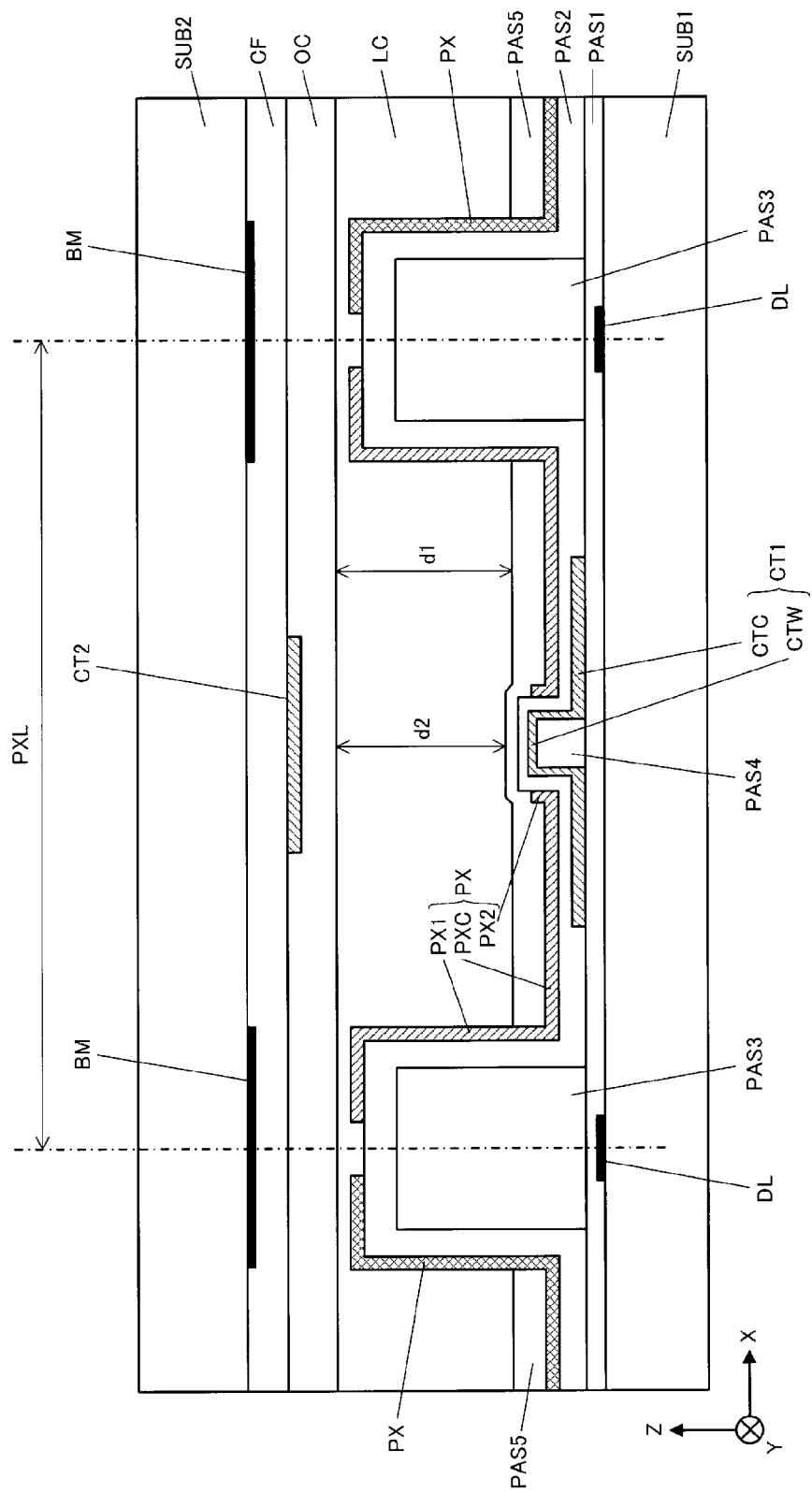
FIG. 14 is a cross-sectional diagram for illustrating the structure of a pixel in a liquid crystal display device according to the fifth embodiment of the present invention.

FIG. 14 is a cross-sectional diagram for illustrating the pixel structure in a liquid crystal display device according to the fifth embodiment of the present invention. The pixel structure according to the fifth embodiment is the same as that in the liquid crystal display device according to the fourth embodiment, except that the thickness of the liquid crystal layer LC in the region where the plane electrode PXC is formed and in the region where the plane common electrode CTC is formed is different. Accordingly, in the following, the thickness of the liquid crystal layer LC is described in detail.

In the same manner as in the liquid crystal display device according to the fourth embodiment, in the liquid crystal display device according to the fifth embodiment as well, the sidewall electrode PX2 that runs in the direction of the thickness of the liquid crystal layer LC (Z direction) is formed on the wall pixel electrode PX on the common electrode CT1 side. In the liquid crystal display device having this structure, the second wall electrode PX2 and the common electrode CT1 are placed in close proximity, and therefore, the electrical field between the second wall electrode PX2 and the common electrode CT1 is great even within the wall pixel electrode PX. That is to say, the electrical field between the second wall electrode PX2 and the common electrode CT1, which is the electrical field in proximity to the second wall electrode PX2, can be made more intense than the electrical field generated between the wall electrode PX1 of the wall pixel electrode PX and the pseudo-wall electrode CT. As a result, the liquid crystal LC in proximity to the pseudo-wall common electrode CT becomes easier to move than between the wall electrode PX1 of the wall pixel electrode PX and the pseudo-wall common electrode CT, and thus, the voltage for gaining the maximum display mode efficiency in proximity to the pseudo-wall common electrode CT (hereinafter referred to as maximum display mode efficiency voltage Vmax) becomes small. In this case, the maximum display mode efficiency voltage Vmax on the pseudo-wall electrode insulating film PAS4 on which the common electrode CT1 is formed and the maximum display mode efficiency voltage Vmax between the wall electrode PX1 and the pseudo-wall common electrode CT are different.

Accordingly, in the pixel structure according to the fourth embodiment, as shown in FIG. 14, the thickness d2 of the liquid crystal layer LC in the region where the wall common electrode CTW, which protrudes toward the liquid crystal layer LC side, that is to say, towards the second substrate SUB2 side, within the common electrode CT1 for forming the pseudo-wall common electrode CT (region where the common electrode CT1 and the common electrode CT2 for forming the pseudo-wall common electrode CT overlap) is thinner than the thickness d1 of the liquid crystal layer LC in the region where the plane electrode PXC is formed, which is the region other than the above. This structure makes the interface anchoring force of the liquid crystal layer LC stronger so that it is difficult for the liquid crystal molecules to move, and thus, the difference between the maximum display mode efficiency voltage Vmax in proximity to the common electrode CT1 and that in other regions can be made smaller.

Accordingly, in the pixel structure according to the fourth embodiment, the thickness d2 of the liquid crystal layer in the region where the pseudo-wall common electrode is formed is thinner than the thickness d1 of the liquid crystal layer in other regions. At this time, in the pixel structure according to the fourth embodiment, the insulating film PAS5 that functions as a flattening film protrudes towards the liquid crystal layer LC side along the contour of the common electrode CT1. That is to say, in the above-described pixel structure according to the fourth embodiment, the insulating film PAS5 makes the thickness of the liquid crystal layer LC in the region surrounded by a pair of wall electrodes PX uniform, while in the pixel structure according to the fifth embodiment, the insulating film PAS5 is formed so that the thickness of the liquid crystal layer meets d1≥d2.

This structure can move (drive) the liquid crystal within the same pixel uniformly, and therefore, such specific effects can be gained that high display mode efficiency can be gained in addition to the above-described effects in the fourth embodiment.

Sixth Embodiment

Figure 15:
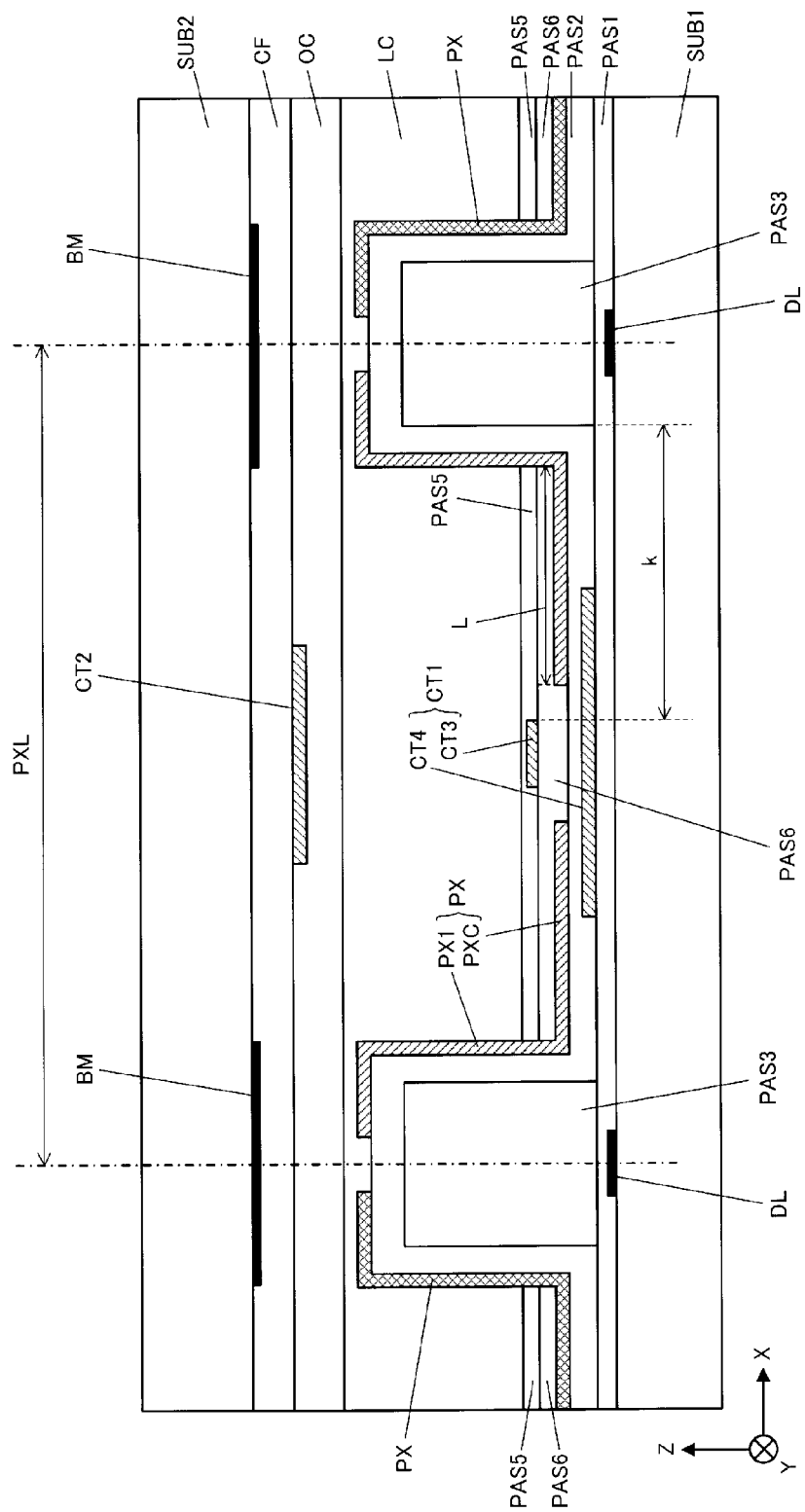
FIG. 15 is a cross-sectional diagram for illustrating the structure of a pixel in a liquid crystal display device according to the sixth embodiment of the present invention.

FIG. 15 is a cross-sectional diagram for illustrating the pixel structure in a liquid crystal display device according to the sixth embodiment of the present invention. The structure excluding the common electrode CT1 for forming the pseudo-wall common electrode CT and the plane common electrode (second plane electrode) CT4 for forming the capacitor Cst is the same as the structure according to the first embodiment. Accordingly, in the following, the structures of the common electrode CT1 and the common holding electrode CTC are described in detail.

As shown in FIG. 15, in the liquid crystal display device according to the sixth embodiment, the common electrode CT2 in linear form that is formed on the second substrate SUB2 and the common electrode (fifth electrode) CT3 in linear form that is formed on the first substrate SUB1 form the pseudo-wall common electrode CT. Meanwhile, the electrode that is placed so as to face the plane electrode PXC of the wall pixel electrode PX so as to form the capacitor Cst is the plane common electrode CT4 in plate form that is formed in a thin film layer that is different from the common electrode CT3. At this time, in the pixel structure according to the sixth embodiment as well, the plane electrode PXC for forming the wall pixel electrode PX is not formed in the region where the pseudo-wall common electrode CT is formed as in the pixel structure according to the first to fifth embodiments. That is to say, the common electrode CT3 and the plane electrode PXC do not overlap as viewed from the display side of the liquid crystal display device. That is to say, in the pixel structure according to the sixth embodiment, the insulating film PAS2 is formed in a layer above the plane common electrode CT4, and the plane electrode PXC is formed in a layer above the insulating film PAS2. In addition, the insulating film PAS6 is formed in a layer above the plane electrode PXC, the common electrode CT3 in linear form is formed in a layer above the insulating film PAS6, and the insulating film PAS5 is formed in a layer above this.

At this time, as shown in FIG. 15, in the pixel structure according to the sixth embodiment, it is desirable for the length L of the plane electrode PXC to be in a range of k/2≤L≤k when the distance between the wall electrode PX1 of the wall pixel electrode PX and the common electrode CT3 is k and the length of the plane electrode PXC is L as in the first embodiment.

As described above, in the pixel structure according to the sixth embodiment as well, the common electrode CT3, which is one of the electrodes for forming the pseudo-wall common electrode CT, is located on the side of the plane electrode PXC closer to the liquid crystal layer LC, that is to say, closer to the second substrate SUB2, and at the same time, the plane common electrode CT4 for forming the capacitor Cst together with the plane electrode PXC is located on the side of the plane electrode PXC further away from the liquid crystal layer LC, that is to say, closer to the first substrate SUB1.

Accordingly, in the pixel structure according to the sixth embodiment as well, in the same manner as in the first embodiment, the plane common electrode CT4 located on the side closer to the first substrate SUB1 can block the electrical field from the signal wire, such as the drain line DL, and adjacent pixels when black is displayed. Furthermore, an electrical field that is parallel to the surface of the substrate can be generated between the wall pixel electrode PX and the common electrode CT that is located on the side close to the liquid crystal layer LC, that is to say, on the side close to the second substrate SUB2, when white is displayed. Accordingly, the same effects as in the first embodiment can be gained. Furthermore, in the pixel structure according to the sixth embodiment, the common electrode CT3 in linear form and the common holding electrode CT4 in plate form are formed in different thin film layers, while the common electrode CT4 is formed of a transparent conductive film material in plate form, and therefore, the effects of preventing the white display mode efficiency from lowering due to the effects of a shift between layers during the formation of the electrodes can be gained.

Figure 16:
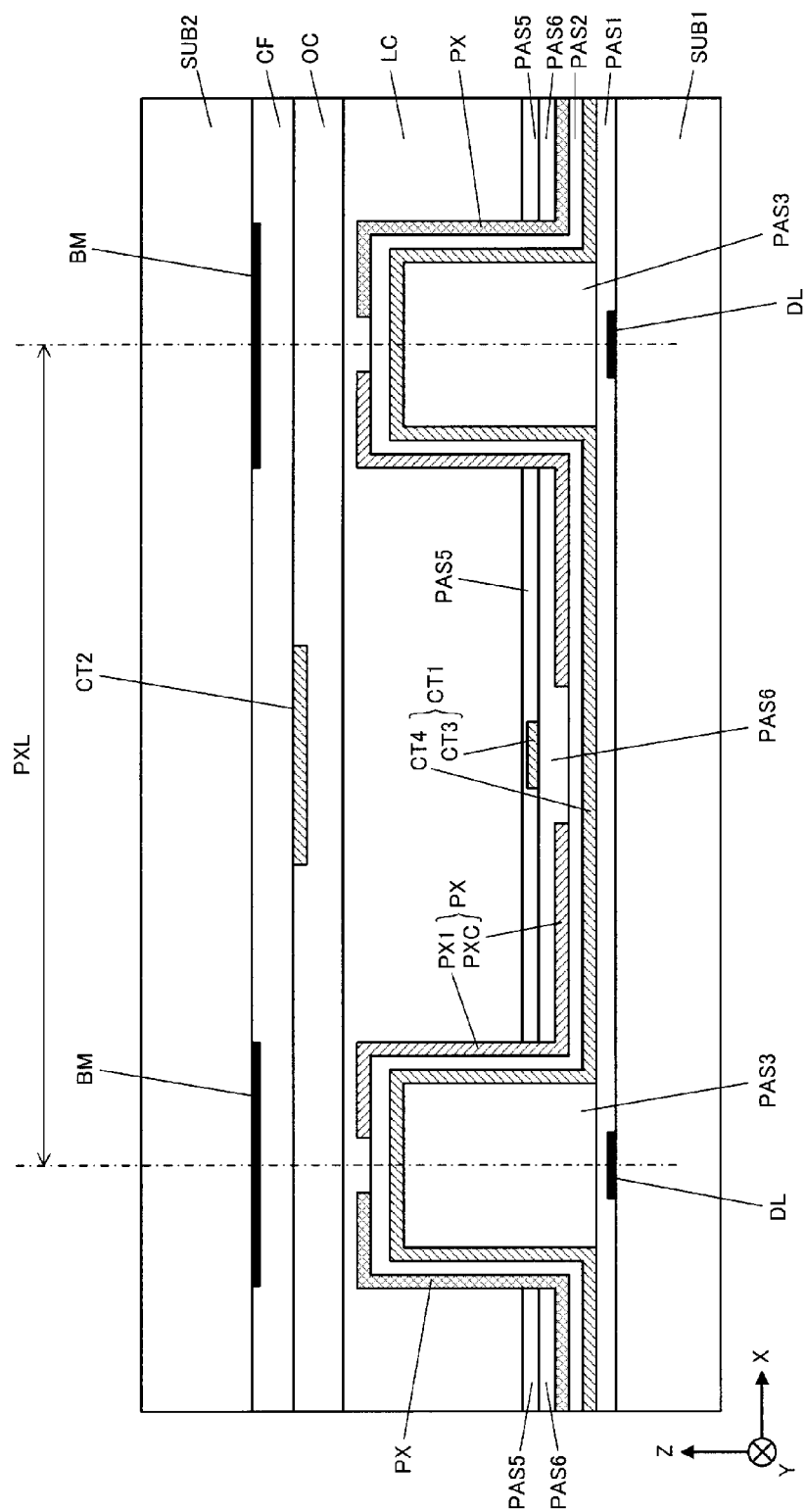
FIG. 16 is a cross-sectional diagram for illustrating the structure of a pixel in another liquid crystal display device according to the sixth embodiment of the present invention.

Though the liquid crystal display device according to the sixth embodiment has such a structure where the common electrode CT3 is formed within the pixel region, the structure is not limited to this. As shown in FIG. 16, for example, the structure where a transparent conductive film is formed in a layer beneath the insulating film PAS2 as a plane common electrode CT4, that is to say, the structure where a plane common electrode CT4 is formed on the entire surface within the display region AR or in each pixel region, so as to cover the wall electrode insulating film PAS3 can gain the same effects as described above for the sixth embodiment.

In the case where the plane common electrode CT4 is formed on the entire surface within the display region AR, it is possible for the area of the electrode for forming the capacitor Cst that is connected parallel to the liquid crystal layer LC to be too great to make the video signal be sufficiently written into the pixel electrode PX due to the capacitor Cst being highly charged. In this case, it is necessary to select appropriate areas for the pixel holding electrode PXC and the plane common electrode CT4 so that the desired capacitor Cst can be gained. In addition, the capacitor Cst may be provided as the combination of the structure shown in FIG. 15 and the structure shown in FIG. 16 within one plane pixel. Naturally, this structure can also gain the same effects as described above.

Seventh Embodiment

Figure 17:
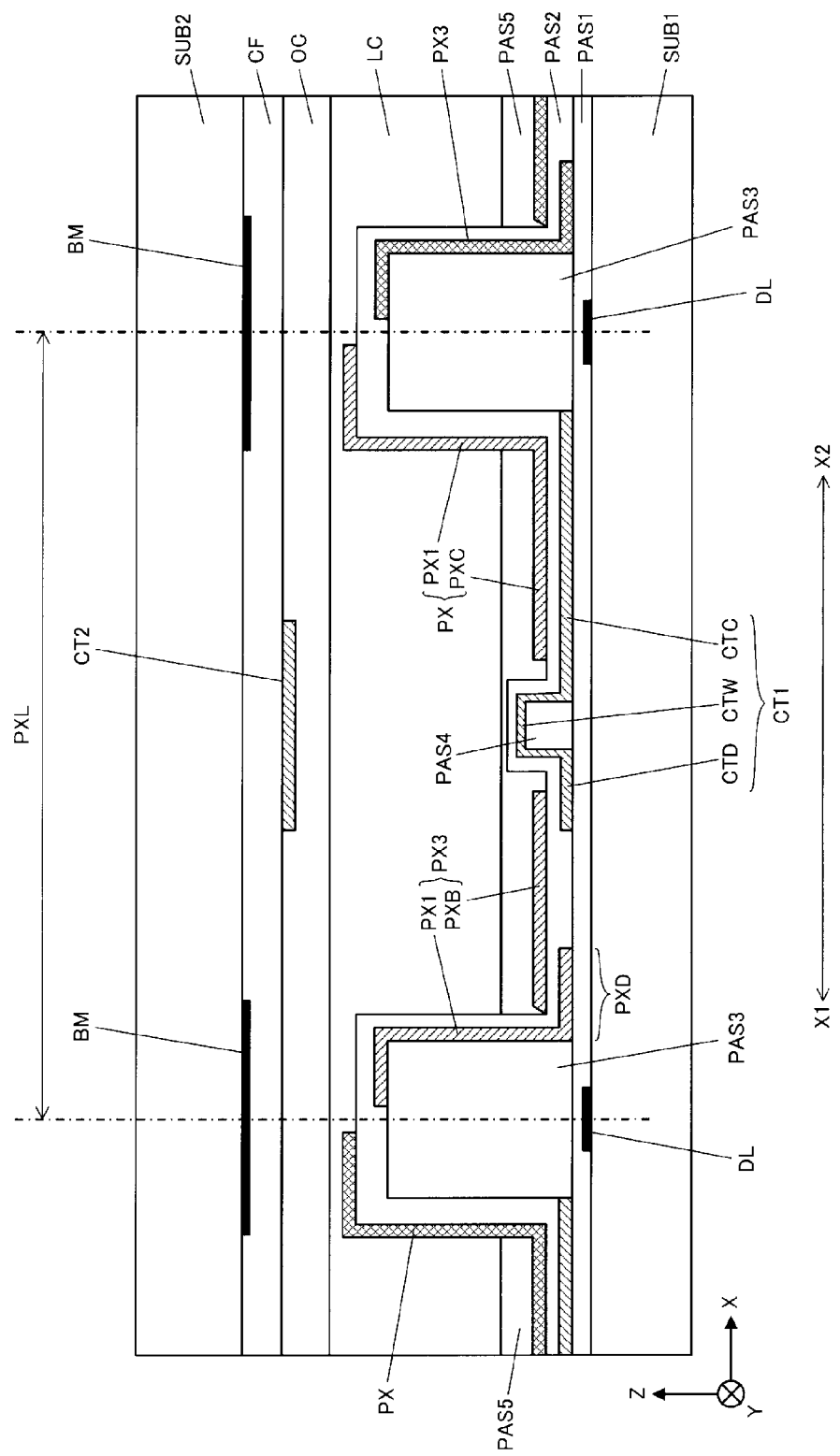
FIG. 17 is a cross-sectional diagram for illustrating the structure of a pixel in a liquid crystal display device according to the seventh embodiment of the present invention.

FIG. 17 is a cross-sectional diagram for illustrating the pixel structure in a liquid crystal display device according to the seventh embodiment of the present invention. Here, the structure of the liquid crystal display device according to the seventh embodiment is the same as the structure according to the first embodiment, except that the structures of the common electrode CT1 and the wall pixel electrode PX3 on the left side of the pseudo-wall common electrode CT in the figure (on the X1 side) are different from those in the first embodiment. In the following, the structures of the common electrode CT1 and the wall pixel electrode PX3 on the X1 side of the pseudo-wall common electrode CT are described in detail. Though in the pixel structure according to the seventh embodiment an end portion of the common holding electrode CTC formed on the right side (X2 side) in the figure of the pseudo-wall common electrode CT runs to the wall electrode insulating film PAS3 in the pixel PXL at the center in the figure, the structure is not limited to this. In the same manner as in the first embodiment, for example, an end portion of the plane common electrode CTC may be formed at a predetermined distance away from the wall electrode insulating film PAS3. Furthermore, the plane common electrode CTC may be formed on the surfaces of a sidewall and the top of the wall electrode insulating film PAS3.

As shown in FIG. 17, the pixel structure according to the seventh embodiment is asymmetric within the region where the same pixel PXL is formed in the direction of the short sides (X direction) of the pixel that is located in a place where the pseudo-wall common electrode CT is formed. In particular, in the structure according to the seventh embodiment, the location and the shape of the thin film layer in which the conductive thin film for forming the wall pixel electrode PX is formed are also different.

That is to say, in the structure according to the seventh embodiment, the wall electrode PX1 is formed on the surface of a sidewall of the wall electrode insulating film PAS3 as the wall pixel electrode PX in the region of the pixel PXL on the X1 side of the pseudo-wall common electrode CT, and at the same time, the periphery portion of the wall electrode PX1 on the upper end side is provided on the surface of the top of the wall electrode insulating film PAS3. In addition, the periphery portion of the wall electrode PX1 on the other end side has an extending portion PXD that runs in a direction in a plane of the first substrate SUB1 in the structure, and the amount of extension of the extending portion PXD is equal to or greater than the extending portion formed on the top. As described below in detail, this structure prevents the wall pixel electrode PX from becoming defective when formed due to a positional shift in the process for forming thin film layers.

In addition, in the pixel structure according to the seventh embodiment, a plane conductive layer (fourth electrode) PXB is formed of a transparent conductive film material so as to cover the region between the wall electrode PX1 and the wall common electrode CTW, and a video signal is supplied to the plane conductive layer PXB like the wall electrode PX1. That is to say, in the pixel structure according to the seventh embodiment, the wall electrode PX1 and the plane conductive layer PCB are electrically connected at an end portion in the pixel region, for example. At this time, in the pixel structure according to the seventh embodiment, the plane electrode PXC for forming the wall pixel electrode PX formed on the X2 side of the wall common electrode CTW and the plane conductive layer PCB are formed in the same layer. At this time, in the pixel structure according to the seventh embodiment, the wall electrode insulating film PAS3 and the pseudo-wall electrode insulating film PAS4 are formed on the upper surface of the insulating film PAS1, and the common electrode CT1 and the wall electrode PX1 on the X1 side are formed on the upper surface of the insulating film PAS1 and on the sidewalls and the upper surface of the wall electrode insulating film PAS3 and the pseudo-wall electrode insulating film PAS4. The insulating film PAS2 is formed so as to cover the wall electrode PX1 formed on the X1 side and the common electrode CT1, and the plane conductive layer PXB and the wall pixel electrode PX on the X2 side are formed in a layer above the insulating film PAS2. In addition, the insulating film PAS5 is formed in a layer above the conductive layer that becomes the plane conductive layer PXB and the wall pixel electrode PX, and an alignment film, not shown, is formed on the upper surface thereof so as to cover at least the display region AR.

In the pixel structure according to the seventh embodiment, the wall pixel electrode PX formed in the region on the X1 side, the wall common electrode CTW and the plane common electrode CTC for forming the common electrode CT1, and the extending portion (plane electrode) CTD are formed in the same layer within the region through which backlight transmits and which is divided into two regions by the wall common electrode CTW within the same pixel. Meanwhile, the plane conductive layer PXB formed in the region on the X2 side in the figure, and the wall electrode PX1 and the plane electrode PXC for forming the wall pixel electrode PX are formed in the same layer. This structure makes it possible for the number of thin film layers to be smaller than that in the conventional liquid crystal display device in the pixel structure according to the seventh embodiment in the same manner as in the above-described structures according to the first to sixth embodiments.

Figure 18A:
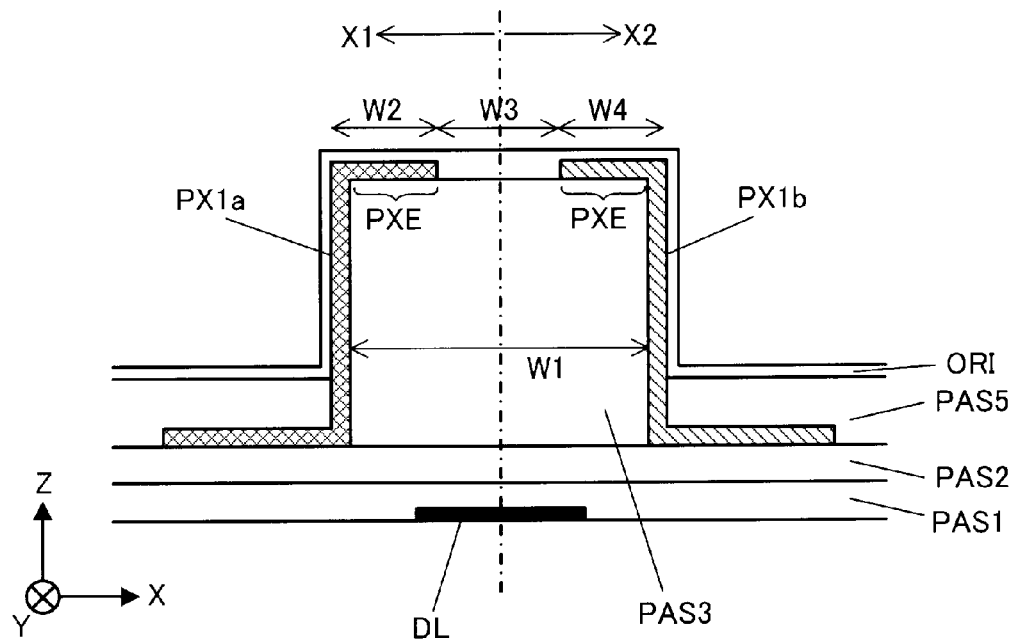
FIGS. 18A and 18B are diagrams showing an enlargement of a wall pixel electrode portion in the liquid crystal display device according to the seventh embodiment of the present invention.
Figure 18B:
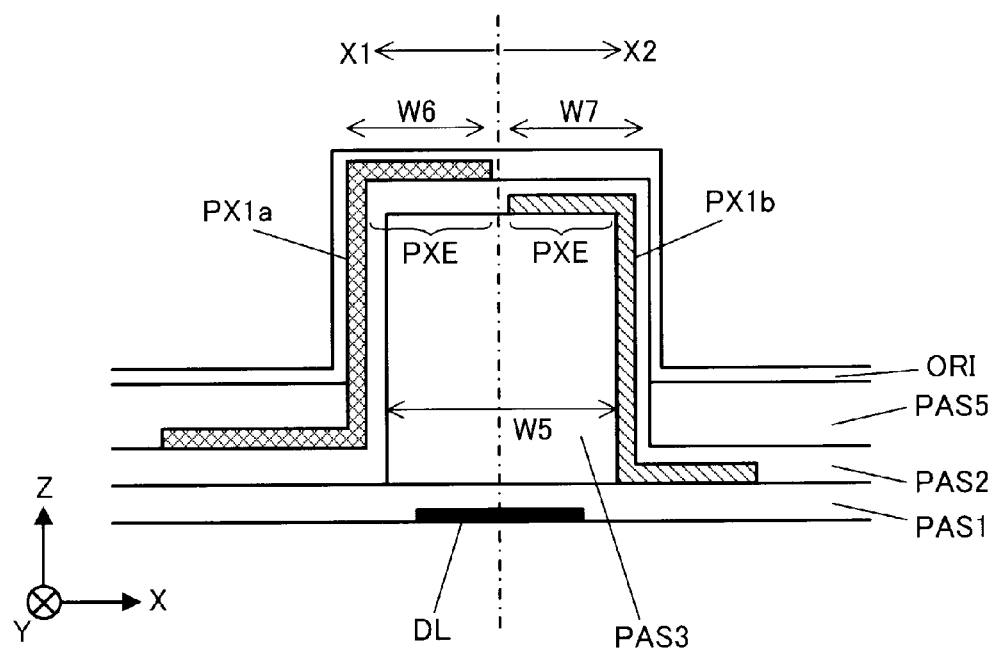
Figure 19:
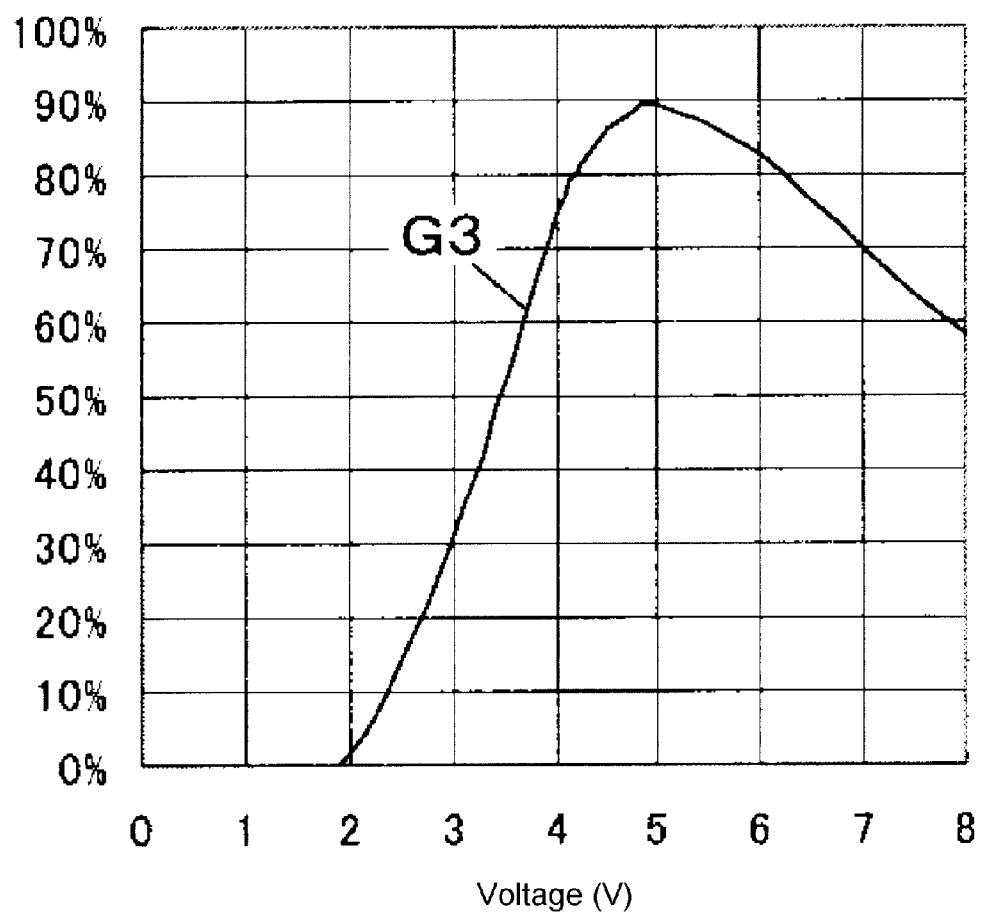
FIG. 19 is a graph for illustrating the results of measurement of the pixel voltage and the display mode efficiency in the liquid crystal display device according to the seventh embodiment of the present invention.

Next, FIGS. 18A and 18B are diagrams showing an enlargement of the wall pixel electrode portion in the liquid crystal display device according to the seventh embodiment of the present invention. FIG. 19 is a graph for illustrating the results of measurement of the pixel voltage and the display mode efficiency in the liquid crystal display device according to the seventh embodiment of the present invention. In the following, the effects of the pixel structure according to the seventh embodiment in response to a positional shift are described in reference to FIGS. 18A to 19. Here, FIG. 18A shows the structure of the wall pixel electrode PX in the first to sixth embodiments, and FIG. 18B shows the structure of the wall pixel electrode PX in the seventh embodiment. In addition, the pixel structure according to the seventh embodiment is a wall electrode structure wherein it is assumed that there is a shift between layers of +/−W (μm), that is to say, W (μm) in the direction of X1, which is the direction of minus, or in the direction of X2, which is the direction of plus, during the manufacturing process. Here, a shift between layers in the present specification means a shift generated between a reference layer and a thin film layer, which is one of the layers layered on top of the reference layer.

As shown in FIG. 18A, in the case where a conductive film is formed on a sidewall of the wall electrode insulating film PAS3 that is formed in a region between the pixel and its adjacent pixel, the wall pixel electrode PXa formed on the X1 side of the pixel border indicated by two-dotted chain line in FIG. 18A and the wall pixel electrode PXb formed on the X2 side have structures symmetric relative to this pixel border. At this time, the wall pixel electrode PXa and the wall pixel electrode PXb are formed in the same layer, that is to say, formed in the same process. Accordingly, the precision in positioning between the wall pixel electrode PXa and the wall pixel electrode PXb is different from the precision for forming a mask pattern for the formation of the wall pixel electrode PXa and the wall pixel electrode PXb, which is extremely precise. As shown in FIG. 18A, however, in the case where the thin film layers are not electrically connected in the same layer, it is necessary to divide the conductive film layer into the respective pieces through etching or the like after the formation of the conductive film layer. In this case, the precision for positioning each piece of the divided conductive film layers is extremely high, but it is necessary to secure a predetermined width W3 for the process of exposure to light because the process is necessary for the formation of divided regions. When the width of the shift between layers is W, there is a shift between layers in the X1 direction or the X2 direction in the figure, and therefore, the amount of extension W2 of the extending portion PXE that runs from the wall electrode PX1a and is formed on the surface on the top of the wall electrode insulating film PAS2 needs to be W2=2×W, which is the amount of extension two times greater than the precision W. Likewise, the amount of extension W4 of the extending portion PXE that runs from the wall electrode PX1b and is formed on the surface of the top of the wall electrode insulating film PAS3 needs to be W4=2×W, which is the amount of extension two times greater than the precision W. Furthermore, a region for dividing the conductive thin film into the wall electrodes PX1a and PX1b in the same layer is also necessary, and the width W3 of this region also needs to be the width W3=2×W, which is two times greater than the width W, taking the shift between layers into consideration. Accordingly, in the structure shown in FIG. 18A, the width W1 of the wall electrode insulating film PAS3 in the X direction needs to be a width of at least W1=W2+W3+W4=(2+2+2)×W=6W.

Meanwhile, in the pixel structure according to the seventh embodiment, as shown in FIG. 18B, the wall electrode PX1a and the wall electrode PX1b that are formed on the sidewalls of the same wall electrode insulating film PAS3 that face each other are formed in different thin film layers. That is to say, the wall electrode PX1b is formed on the surface of the wall electrode insulating film PAS3, and at the same time, the wall electrode PX1a is formed on the surface of the insulating film PAS2, which is formed so as to cover the wall electrode PX1b in the structure. Accordingly, when the wall electrode PX1a and the wall electrode PX1b are formed, the wall electrode PX1a and the wall electrode PX1b are not electrically connected in the structure even in the case where there is a shift between layers around the wall electrode insulating film PAS3. As a result, in the pixel structure according to the seventh embodiment, only the amount of extension of the extending portions of the wall electrodes PX1a and PX1b that accompanies the shift between layers may be taken into consideration, and therefore, the width W5 of the wall electrode insulating film PAS3 in the X direction is W5=W6+W7=(2+2)×W=4W. That is to say, it is possible to downscale the width of the region for forming wall electrodes PXa and PXb in adjacent pixels that are formed in the same wall electrode insulating film PAS3 to 4W/6W=⅔, and thus, it is possible to increase the aperture ratio, and it is possible to increase the display mode efficiency in the entirety of the liquid crystal display device.

FIG. 19 is a graph showing the display mode efficiency in the liquid crystal display device according to the seventh embodiment of the present invention. As is clear from the curve G3 in FIG. 19, the display mode efficiency can be 90% in a region where the pixel voltage is approximately 5V. That is to say, as is clear from the curve G3 in FIG. 19, even in the pixel structure according to the seventh embodiment, the display mode efficiency is approximately 90%, and the black display mode efficiency is approximately the same as the orthogonal transmittance of the polarizing plate, and therefore, the same results as in the first embodiment can be gained. Accordingly, even in the pixel structure according to the seventh embodiment, the cost can be lowered due to the reduction in the number of layers, the black display mode efficiency can be prevented from increasing and the white display mode efficiency can be prevented from lowering due to the effects of the potential around the pixel, the white display mode efficiency can be prevented from lowering due to the effects from a shift between layers in the electrode on the first substrate SUB1, the effects from the shift between layers in the manufacturing process can be suppressed, and a high aperture ratio can be implemented. Therefore, the aperture ratio can be increased even when the manufacturing process during which a shift between layers occurs is taken into consideration.

As described above, the liquid crystal display device according to the seventh embodiment has such a structure that a wall pixel electrode PX having a wall electrode (sidewall electrode) PX1 and a plane electrode PXC that is formed so as to run from a periphery portion of the wall electrode PX1 is formed on the wall common electrode CTW in the pixel region on the X2 side, and at the same time, the plane common electrode CTC that is formed to extend from the wall common electrode CTW is formed in a layer beneath the wall pixel electrode PX so that the capacitor Cst for the pixel can be formed. In addition, in this region, the structure having the pixel holding electrode PXC and the common holding electrode CTC is the same as the structures according to the first to sixth embodiments, and therefore, the above-described effects can be gained.

Meanwhile, in the pixel region on the X1 side of the wall common electrode CTW, the wall electrode PX1 formed in the same layer as the plane common electrode CTC is provided, and at the same time, the plane conductive layer PBX that runs from the location in which the wall electrode PX1 is formed to the location in which the wall common electrode CTW is formed is formed so that the plane conductive layer PBX is formed in the same layer as the wall electrode PX1 and the plane electrode PXC in the structure. At this time, the extending portion that runs from the wall electrode PX1 and the wall common electrode CTW in a direction in a plane of the first substrate SUB1 overlaps an end portion of the plane conductive layer PXB, and therefore, in the same manner as in the structures according to the first to sixth embodiments, an electrical field from an adjacent pixel or a signal line can be blocked, and the intensity of an electrical field generated between the pseudo-wall common electrode CT and the wall electrode PX or the plane conductive layer PXB can be increased.

Furthermore, when the width of the wall electrode insulating film PAS3 is great, the area through which liquid crystal moves becomes smaller, and thus, the aperture ratio effectively lowers, and therefore, the display mode efficiency for all the pixels is lowered. In the structure according to the seventh embodiment, however, the wall electrodes PX1 formed on the same wall electrode insulating film PAS3 can be formed in different thin film layers, and therefore, the width W5 of the wall electrode insulating film PAS3 can be made small. As a result, the aperture ratio of the pixel can be increased, and therefore, such specific effects that the display mode efficiency can be further increased can be gained.

Figure 20:
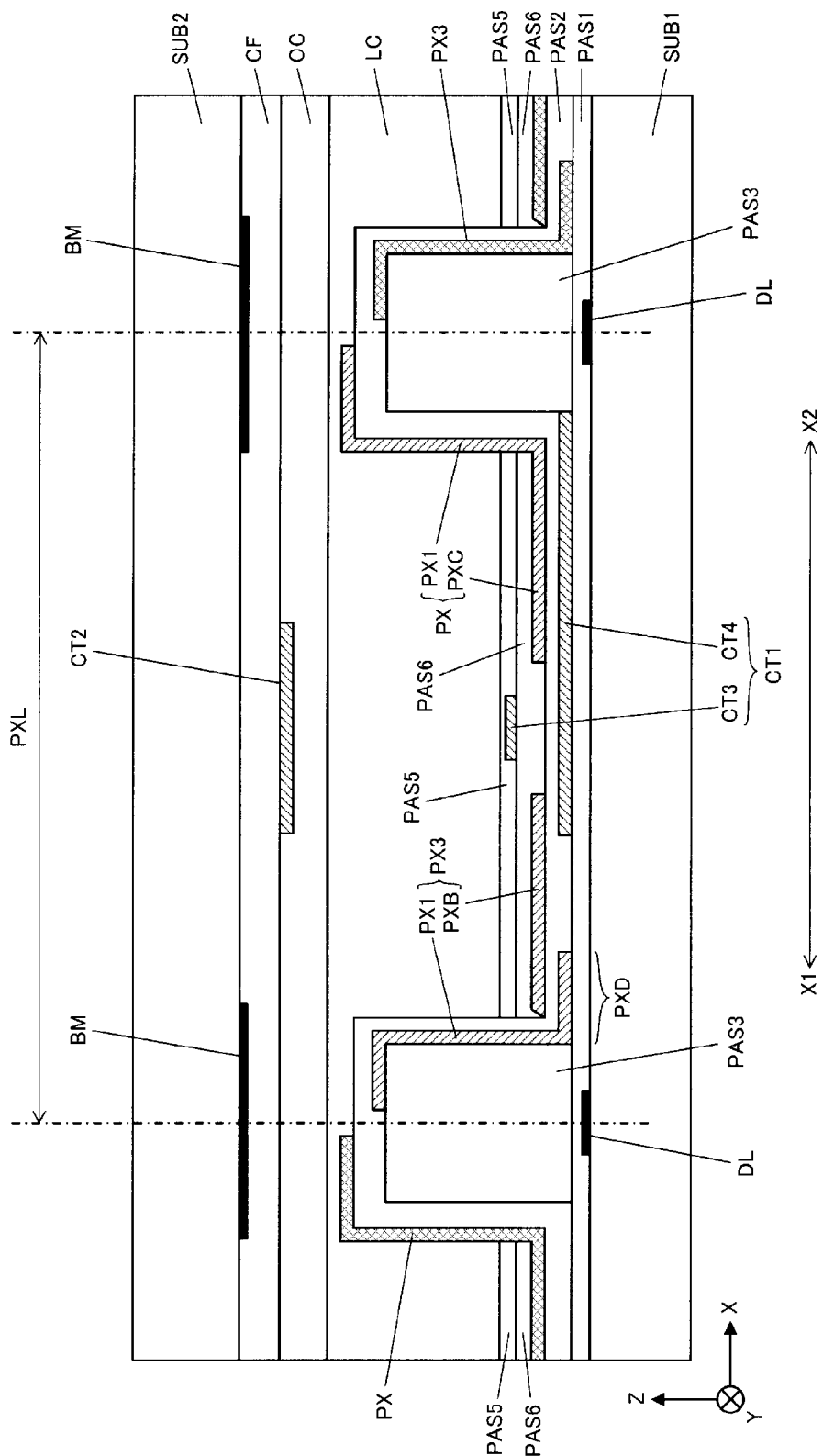
FIG. 20 is a cross-sectional diagram for illustrating the structure of a pixel in another liquid crystal display device according to the seventh embodiment of the present invention.

Though the above-described liquid crystal display device according to the seventh embodiment has such a structure that the common electrode CT1 is formed on the surfaces of a sidewall and the top of the pseudo-wall electrode insulating film PAS4, the structure is not limited to this. As shown in FIG. 20, for example, the common electrode CT2 in linear form that is formed on the second substrate SUB2 and the common electrode CT3 in linear form that is formed on the first substrate SUB1 may form a pseudo-wall common electrode CT, and at the same time, the plane electrode PXC and the plane common electrode CT4 may form the capacitor Cst in the structure as in the sixth embodiment.

Another liquid crystal display device according to the seventh embodiment of the present invention shown in FIG. 20 has such a pixel structure that wall pixel electrodes PX are provided in different layers on either side of the wall electrode insulating films PAS3 in the pixel borders indicated by two-dotted chain line. The first wall electrode PX1 that covers the side of the wall electrode insulating film PAS3 on the X2 side in the pixel border and the plane conductive layer PXB, which runs in a direction in a plane from the surface through which the first wall electrode PX1 makes contact with the first substrate SUB1, are electrically connected so as to form one wall pixel electrode PX. In addition, the wall electrode PX1 that covers the side of the wall electrode insulating film PAX3 on the X1 side in the pixel border and the plane electrode PXC that runs in a direction in a plane from the surface through which the wall electrode PX1 makes contact with the first substrate SUB1 form another wall pixel electrode PX. At this time, the plane conductive layer PXB is placed in the region on the X1 side of the pseudo-wall electrode insulating film PAS4 within the region between the wall electrode insulating film PAS3 and the pseudo-wall insulating film PAS4 within the same pixel, that is to say, on the surface where the plane electrode PXC is not provided, and thus, the plane electrode PXC and the plane conductive layer PXB are provided in the same layer in the structure.

Furthermore, the wall electrode PX1, the plane electrode PXC and the plane conductive layer PXB are electrically connected, and the insulating film PAS2 is provided between the liquid crystal layer and the plane electrode PXC and between the liquid crystal layer and the plane conductive layer PXB. In addition, the plane common electrode CT4 is formed in a layer beneath the plane electrode PXC, and the plane electrode PXC and the plane common electrode CT4 form the capacitor Cst. This common electrode CT4 is electrically connected to the common electrode CT3 that forms the pseudo-wall common electrode CT together with the common electrode 2. In addition, the common electrode CT3 is formed in the thin film layer that is closer to the liquid crystal layer LC than the plane electrode PXC or the plane conductive layer PXB in the same manner as in the sixth embodiment. In another liquid crystal display device according to the seventh embodiment having this structure as well, the wall pixel electrode PX on the X1 side and the plane common electrode CT4 are formed in the same layer, and after that, the wall pixel electrode PX on the X2 side and the plane conductive layer PXB can be formed in the same layer, and therefore, the number of thin film layers can be reduced by one in the same manner as in the seventh embodiment, and at the same time, the above-described effects can be gained.

Though in the above-described liquid crystal display devices according to the first to seventh embodiments a case where pixels are formed linearly in the Y direction is described, the invention can be applied to a liquid crystal display device having a so-called multi-domain structure where the wall pixel electrodes PX and the pseudo-wall common electrodes CT incline clockwise or counterclockwise by a predetermined angle relative to the Y direction, for example.

In addition, the capacitor Cst may be formed as a combination of the electrode structures according to the first to seventh embodiments. In particular, when a number of structures are combined within each pixel, the same effects as in the above-described structures according to the first to seventh embodiments can be gained.

Though the invention made by the present inventor is typically described above on the basis of the embodiments of the invention, the present invention is not limited to the above-described embodiments of the invention, and various modifications are possible as long as the gist of the invention is not deviated from.

What is claimed is:

1. A liquid crystal display device, comprising a first substrate and a second substrate that are provided so as to face each other with a liquid crystal layer in between, wherein said first substrate has video signal lines that run in a Y direction and are aligned in an X direction and scan signal lines that run in the X direction and are aligned in the Y direction so that pixels are formed in a matrix with each pixel in a region between a pair of video signal lines and a pair of scan signal lines, characterized in that the liquid crystal display device further comprises:
a pair of first electrodes in wall form that at least partially overlap a pair of first structures that are formed along either side in the longitudinal direction of a pixel so as to protrude from said first substrate on the liquid crystal side towards said liquid crystal layer side; and
a second electrode formed in a pixel display region sandwiched between said pair of first electrodes and formed in a direction in which said first electrodes run,
said first electrodes are formed of:
a wall electrode that is formed on a sidewall surface of said structure, protruding so as to be in a wall form in a direction of a normal to said first substrate and running in the longitudinal direction of the pixel; and
a plane electrode that runs in a plane direction of the first substrate from a side of said wall electrode on the first substrate side in such a manner that an end portion thereof runs in proximity to the second electrode;
at least either said plane electrode or said second electrode covers said pixel display region;
the liquid crystal display device further has a second wall electrode that is formed so as to cover said first structure and is placed so as to face said wall electrode with said insulating film in between; and
said wall electrode and said second wall electrode form a capacitor for the pixel.

2. A liquid crystal display device, comprising a first substrate and a second substrate that are provided so as to face each other with a liquid crystal layer in between, wherein said first substrate has video signal lines that run in a Y direction and are aligned in an X direction and scan signal lines that run in the X direction and are aligned in the Y direction so that pixels are formed in a matrix with each pixel in a region between a pair of video signal lines and a pair of scan signal lines, characterized in that the liquid crystal display device further comprises:
a pair of first electrodes in wall form that at least partially overlap a pair of first structures that are formed along either side in the longitudinal direction of a pixel so as to protrude from said first substrate on the liquid crystal side towards said liquid crystal layer side; and
a second electrode formed in a pixel display region sandwiched between said pair of first electrodes and formed in a direction in which said first electrodes run,
said first electrodes are formed of:
a wall electrode that is formed on a sidewall surface of said structure, protruding so as to be in a wall form in a direction of a normal to said first substrate and running in the longitudinal direction of the pixel; and
a plane electrode that runs in a plane direction of the first substrate from a side of said wall electrode on the first substrate side in such a manner that an end portion thereof runs in proximity to the second electrode;
at least either said plane electrode or said second electrode covers said pixel display region;
a second structure that is formed in a pixel display region sandwiched between said pair of first electrodes, protrudes from said first substrate on the liquid crystal side towards said liquid crystal layer side and runs in a direction in which said first structure runs;

said second electrode is formed so as to cover a surface on a sidewall of said second structure and a surface on top of said second structure on the liquid crystal layer side;

the surface on top of said second structure is located closer to said liquid crystal layer than said plane electrode; and said first electrode has a second wall electrode that runs along a surface of a sidewall of said second structure, protrudes in a wall form in a direction of a normal to said first substrate, and runs in the longitudinal direction of the pixel.

3. A liquid crystal display device, comprising a first substrate and a second substrate that are provided so as to face each other with a liquid crystal layer in between, wherein said first substrate has video signal lines that run in a Y direction and are aligned in an X direction and scan signal lines that run in the X direction and are aligned in the Y direction so that pixels are formed in a matrix with each pixel in a region between a pair of video signal lines and a pair of scan signal lines, characterized in that the liquid crystal display device further comprises:

a pair of first electrodes in wall form that at least partially overlap a pair of first structures that are formed along either side in the longitudinal direction of a pixel so as to protrude from said first substrate on the liquid crystal side towards said liquid crystal layer side; and a second electrode formed in a pixel display region sandwiched between said pair of first electrodes and formed in a direction in which said first electrodes run, said first electrodes are formed of:

a wall electrode that is formed on a sidewall surface of said structure, protruding so as to be in a wall form in a direction of a normal to said first substrate and running in the longitudinal direction of the pixel; and a plane electrode that runs in a plane direction of the first substrate from a side of said wall electrode on the first substrate side in such a manner that an end portion thereof runs in proximity to the second electrode;

at least either said plane electrode or said second electrode covers said pixel display region; and said pair of first electrodes are formed in different thin film layers, and the wall electrodes of the adjacent pixels that are formed in the same first structure are formed in different thin film layers.

4. The liquid crystal display device according to claim 3, characterized in that one of said pair of first electrodes has a wall electrode and a plane electrode, and the other has a wall electrode and a fourth electrode that is formed in a layer that is different from the wall electrode and provided so as to cover a pixel display region on the first electrode side, the wall electrode of the other first electrode is formed in the same layer as said second electrode, and said wall electrode and said plane electrode of the one of said pair of first electrodes are formed in the same layer as said fourth electrode.

* * * * *